US007979429B2

(12) United States Patent
Shirota

(10) Patent No.: US 7,979,429 B2
(45) Date of Patent: Jul. 12, 2011

(54) METHOD, APPARATUS, AND COMPUTER PROGRAM PRODUCT FOR LOCATING DATA IN LARGE DATASETS

(75) Inventor: Masakazu Shirota, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 11/926,337

(22) Filed: Oct. 29, 2007

(65) Prior Publication Data

US 2008/0065686 A1    Mar. 13, 2008

Related U.S. Application Data

(63) Continuation of application No. 10/319,271, filed on Dec. 13, 2002, now Pat. No. 7,333,973.

(30) Foreign Application Priority Data

Dec. 17, 2001  (JP) ................................. 2001-382814

(51) Int. Cl.
*G06F 7/00* (2006.01)

(52) U.S. Cl. ........................................................ 707/730

(58) Field of Classification Search .............. 707/3, 728, 707/730, 100, 999.1
See application file for complete search history.

(56) References Cited

U.S. PATENT DOCUMENTS

| | | | | |
|---|---|---|---|---|
| 5,440,481 A | * | 8/1995 | Kostoff et al. ..................... 707/5 |
| 5,970,485 A | * | 10/1999 | Sugaya et al. ..................... 707/4 |
| 6,408,294 B1 | * | 6/2002 | Getchius et al. .................. 707/5 |
| 6,931,398 B2 | | 8/2005 | Namba |
| 7,003,519 B1 | * | 2/2006 | Biettron et al. ................... 707/6 |
| 2007/0002982 A1 | * | 1/2007 | Heikkila ........................ 375/346 |
| 2007/0250274 A1 | * | 10/2007 | Volkov et al. ................... 702/22 |
| 2007/0300149 A1 | * | 12/2007 | Bryant et al. .................. 715/513 |
| 2009/0003655 A1 | * | 1/2009 | Wollenweber ................ 382/107 |

OTHER PUBLICATIONS

"Data Science Series 3", Data Mining, dated Sep. 1, 2001; pp. 18-51.
"Forefront of Database", vol. 32, No. 10; Data Mining-Knowledge Discovery From Data, dated Oct. 1, 2000, pp. 77-100; and.
"Visualization of Association Rules", IEICE Technical Report, vol. 95, No. 81; May 26, 1995, pp. 41-48.

* cited by examiner

*Primary Examiner* — Robert Timblin
*Assistant Examiner* — Mohammed R Uddin
(74) *Attorney, Agent, or Firm* — Scully, Scott, Murphy & Presser, P.C.; David Adour, Esq.

(57) ABSTRACT

To analyze a data set having one-to-many relation, the number of simultaneous occurrences of data in which two data elements are coexistent is obtained for all combinations of two data elements. A dependence ratio of one data element upon the other data element is calculated from the numbers of simultaneous occurrences. The data elements are grouped based upon the numbers of occurrences of individual data elements and the dependence ratios compared with the predetermined thresholds. Based on the number of occurrences of individual data elements and the dependence ratios, subordinate relations of data elements within the same group are specified and displayed to a user in the form of a tree or balloon figure.

9 Claims, 34 Drawing Sheets

FIG. 3

| Sample Number | Data 1 | Data 2 | Data 3 | Data 4 |
|---|---|---|---|---|
| 10001 | A | C | | |
| 10002 | B | C | | |
| 10003 | B | C | | |
| 10004 | C | D | | |
| 10005 | A | B | C | D |
| 10006 | A | B | | |
| 10007 | A | B | C | E |
| 10008 | C | D | E | |
| 10009 | C | F | | |
| 10010 | C | F | | |
| 10011 | C | | | |
| 10012 | A | | | |
| 10013 | G | I | | |
| 10014 | G | H | I | |
| 10015 | A | B | | |
| 10016 | G | H | I | |
| 10017 | A | | | |
| 10018 | A | | | |
| 10019 | G | | | |
| 10020 | A | B | C | |
| 10021 | G | H | | |
| 10022 | J | | | |
| 10023 | A | | | |
| 10024 | A | G | I | |
| 10025 | A | B | C | |
| 10026 | A | | | |
| 10027 | G | | | |
| 10028 | G | H | I | |
| 10029 | A | B | | |
| 10030 | G | I | | |
| 10031 | K | L | | |

FIG. 4

| Sample Number | Data |
|---|---|
| 10001 | A |
| 10001 | C |
| 10002 | B |
| 10002 | C |
| 10003 | B |
| 10003 | C |
| 10004 | C |
| 10004 | D |
| 10005 | A |
| 10005 | B |
| 10005 | C |
| 10005 | D |
| 10006 | A |
| 10006 | B |
| 10007 | A |
| 10007 | B |
| 10007 | C |
| 10007 | E |
| 10008 | C |
| 10008 | D |
| 10008 | E |
| 10009 | C |
| 10009 | F |
| 10010 | C |
| 10010 | F |
| 10011 | C |
| 10012 | A |
| 10013 | G |
| 10013 | I |
| 10014 | G |
| 10014 | H |
| 10014 | I |
| 10015 | A |
| 10015 | B |
| 10016 | G |
| 10016 | H |
| 10016 | I |
| 10017 | A |
| 10018 | A |
| 10019 | G |
| 10020 | A |
| 10020 | B |
| 10020 | C |
| 10021 | G |
| 10021 | H |
| 10022 | J |
| 10023 | A |
| 10024 | A |
| 10024 | G |
| 10024 | I |
| 10025 | A |
| 10025 | B |
| 10025 | C |
| 10026 | A |
| 10027 | G |
| 10028 | G |
| 10028 | H |
| 10028 | I |
| 10029 | A |
| 10029 | B |
| 10030 | G |
| 10030 | I |
| 10031 | K |
| 10031 | L |

| Data | Number of occurrences |
|:---:|:---:|
| A | 14 |
| B | 9 |
| C | 12 |
| D | 3 |
| E | 2 |
| F | 2 |
| G | 9 |
| H | 4 |
| I | 6 |
| J | 1 |
| K | 1 |
| L | 1 |

| Data | Data | Number of sumultaneous occurrences |
|---|---|---|
| A | B | 7 |
| A | C | 5 |
| A | D | 1 |
| A | E | 1 |
| A | F | 0 |
| A | G | 1 |
| A | H | 0 |
| A | I | 1 |
| A | J | 0 |
| A | K | 0 |
| A | L | 0 |
| B | C | 6 |
| B | D | 1 |
| B | E | 1 |
| B | F | 0 |
| B | G | 0 |
| B | H | 0 |
| B | I | 0 |
| B | J | 0 |
| B | K | 0 |
| B | L | 0 |
| C | D | 3 |
| C | E | 2 |
| C | F | 2 |
| C | G | 0 |
| C | H | 0 |
| C | I | 0 |
| C | J | 0 |
| C | K | 0 |
| C | L | 0 |
| D | E | 1 |
| D | F | 0 |
| D | G | 0 |
| D | H | 0 |
| D | I | 0 |
| D | J | 0 |
| D | K | 0 |
| D | L | 0 |
| E | F | 0 |
| E | G | 0 |
| E | H | 0 |
| E | I | 0 |
| E | J | 0 |
| E | K | 0 |
| E | L | 0 |
| F | G | 0 |
| F | H | 0 |
| F | I | 0 |
| F | J | 0 |
| F | K | 0 |
| F | L | 0 |
| G | H | 4 |
| G | I | 6 |
| G | J | 0 |
| G | K | 0 |
| G | L | 0 |
| H | I | 3 |
| H | J | 0 |
| H | K | 0 |
| H | L | 0 |
| I | J | 0 |
| I | K | 0 |
| I | L | 0 |
| J | K | 0 |
| J | L | 0 |
| K | L | 1 |

| Main data | Subordinate data | Number of occurrences of main data | Number of simultaneous occurrences | Dependence ratio | Threshold condition ≥3 | ≥1 | ≥0.60 | Conditional flag |
|---|---|---|---|---|---|---|---|---|
| A | B | 14 | 7 | 0.50 | 1 | 1 | 0 | 0 |
| A | C | 14 | 5 | 0.36 | 1 | 1 | 0 | 0 |
| A | D | 14 | 1 | 0.07 | 1 | 1 | 0 | 0 |
| A | E | 14 | 1 | 0.07 | 1 | 1 | 0 | 0 |
| A | F | 14 | 0 | 0.00 | 1 | 0 | 0 | 0 |
| A | G | 14 | 1 | 0.07 | 1 | 1 | 0 | 0 |
| A | H | 14 | 0 | 0.00 | 1 | 0 | 0 | 0 |
| A | I | 14 | 1 | 0.07 | 1 | 1 | 0 | 0 |
| A | J | 14 | 0 | 0.00 | 1 | 0 | 0 | 0 |
| A | K | 14 | 0 | 0.00 | 1 | 0 | 0 | 0 |
| A | L | 14 | 0 | 0.00 | 1 | 0 | 0 | 0 |
| B | A | 9 | 7 | 0.78 | 1 | 1 | 1 | 1 |
| B | C | 9 | 6 | 0.67 | 1 | 1 | 1 | 1 |
| B | D | 9 | 1 | 0.11 | 1 | 1 | 0 | 0 |
| B | E | 9 | 1 | 0.11 | 1 | 1 | 0 | 0 |
| B | F | 9 | 0 | 0.00 | 1 | 0 | 0 | 0 |
| B | G | 9 | 0 | 0.00 | 1 | 0 | 0 | 0 |
| B | H | 9 | 0 | 0.00 | 1 | 0 | 0 | 0 |
| B | I | 9 | 0 | 0.00 | 1 | 0 | 0 | 0 |
| B | J | 9 | 0 | 0.00 | 1 | 0 | 0 | 0 |
| B | K | 9 | 0 | 0.00 | 1 | 0 | 0 | 0 |
| B | L | 9 | 0 | 0.00 | 1 | 0 | 0 | 0 |
| C | A | 12 | 5 | 0.42 | 1 | 1 | 0 | 0 |
| C | B | 12 | 6 | 0.50 | 1 | 1 | 0 | 0 |
| C | D | 12 | 3 | 0.25 | 1 | 1 | 0 | 0 |
| C | E | 12 | 2 | 0.17 | 1 | 1 | 0 | 0 |
| C | F | 12 | 2 | 0.17 | 1 | 0 | 0 | 0 |
| C | G | 12 | 0 | 0.00 | 1 | 0 | 0 | 0 |
| C | H | 12 | 0 | 0.00 | 1 | 0 | 0 | 0 |
| C | I | 12 | 0 | 0.00 | 1 | 0 | 0 | 0 |
| C | J | 12 | 0 | 0.00 | 1 | 0 | 0 | 0 |
| C | K | 12 | 0 | 0.00 | 1 | 0 | 0 | 0 |
| C | L | 12 | 0 | 0.00 | 1 | 0 | 0 | 0 |
| D | A | 3 | 1 | 0.33 | 1 | 1 | 0 | 0 |
| D | B | 3 | 1 | 0.33 | 1 | 1 | 0 | 0 |
| D | C | 3 | 3 | 1.00 | 1 | 1 | 1 | 1 |
| D | E | 3 | 1 | 0.33 | 1 | 0 | 0 | 0 |
| D | F | 3 | 0 | 0.00 | 1 | 0 | 0 | 0 |
| D | G | 3 | 0 | 0.00 | 1 | 0 | 0 | 0 |
| D | H | 3 | 0 | 0.00 | 1 | 0 | 0 | 0 |
| D | I | 3 | 0 | 0.00 | 1 | 0 | 0 | 0 |
| D | J | 3 | 0 | 0.00 | 1 | 0 | 0 | 0 |
| D | K | 3 | 0 | 0.00 | 1 | 0 | 0 | 0 |
| D | L | 3 | 0 | 0.00 | 1 | 0 | 0 | 0 |
| G | A | 9 | 1 | 0.11 | 1 | 1 | 0 | 0 |
| G | B | 9 | 0 | 0.00 | 1 | 0 | 0 | 0 |
| G | C | 9 | 0 | 0.00 | 1 | 0 | 0 | 0 |
| G | D | 9 | 0 | 0.00 | 1 | 0 | 0 | 0 |
| G | E | 9 | 0 | 0.00 | 1 | 0 | 0 | 0 |
| G | F | 9 | 0 | 0.00 | 1 | 0 | 0 | 0 |
| G | H | 9 | 4 | 0.44 | 1 | 1 | 0 | 0 |
| G | I | 9 | 6 | 0.67 | 1 | 1 | 1 | 1 |
| G | J | 9 | 0 | 0.00 | 1 | 0 | 0 | 0 |
| G | K | 9 | 0 | 0.00 | 1 | 0 | 0 | 0 |
| G | L | 9 | 0 | 0.00 | 1 | 0 | 0 | 0 |
| H | A | 4 | 0 | 0.00 | 1 | 0 | 0 | 0 |
| H | B | 4 | 0 | 0.00 | 1 | 0 | 0 | 0 |
| H | C | 4 | 0 | 0.00 | 1 | 0 | 0 | 0 |
| H | D | 4 | 0 | 0.00 | 1 | 0 | 0 | 0 |
| H | E | 4 | 0 | 0.00 | 1 | 0 | 0 | 0 |
| H | F | 4 | 0 | 0.00 | 1 | 0 | 0 | 0 |
| H | G | 4 | 4 | 1.00 | 1 | 1 | 1 | 1 |
| H | I | 4 | 3 | 0.75 | 1 | 1 | 1 | 1 |
| H | J | 4 | 0 | 0.00 | 1 | 0 | 0 | 0 |
| H | K | 4 | 0 | 0.00 | 1 | 0 | 0 | 0 |
| H | L | 4 | 0 | 0.00 | 1 | 0 | 0 | 0 |
| I | A | 6 | 1 | 0.17 | 1 | 1 | 0 | 0 |
| I | B | 6 | 0 | 0.00 | 1 | 0 | 0 | 0 |
| I | C | 6 | 0 | 0.00 | 1 | 0 | 0 | 0 |
| I | D | 6 | 0 | 0.00 | 1 | 0 | 0 | 0 |
| I | E | 6 | 0 | 0.00 | 1 | 0 | 0 | 0 |
| I | F | 6 | 0 | 0.00 | 1 | 0 | 0 | 0 |
| I | G | 6 | 6 | 1.00 | 1 | 1 | 1 | 1 |
| I | H | 6 | 3 | 0.50 | 1 | 1 | 0 | 0 |
| I | J | 6 | 0 | 0.00 | 1 | 0 | 0 | 0 |
| I | K | 6 | 0 | 0.00 | 1 | 0 | 0 | 0 |
| I | L | 6 | 0 | 0.00 | 1 | 0 | 0 | 0 |
| J | A | 1 | 0 | 0.00 | 0 | 0 | 0 | 0 |
| J | B | 1 | 0 | 0.0 | 0 | 0 | 0 | 0 |
| J | C | 1 | 0 | 0.00 | 0 | 0 | 0 | 0 |
| J | D | 1 | 0 | 0.00 | 0 | 0 | 0 | 0 |
| J | E | 1 | 0 | 0.00 | 0 | 0 | 0 | 0 |
| J | F | 1 | 0 | 0.00 | 0 | 0 | 0 | 0 |
| J | G | 1 | 0 | 0.00 | 0 | 0 | 0 | 0 |
| J | H | 1 | 0 | 0.00 | 0 | 0 | 0 | 0 |
| J | I | 1 | 0 | 0.00 | 0 | 0 | 0 | 0 |
| J | K | 1 | 0 | 0.00 | 0 | 0 | 0 | 0 |
| J | L | 1 | 0 | 0.00 | 0 | 0 | 0 | 0 |

FIG. 7
(Cont'd)

| | | | | | | | | | | | | | | | | | | |
|---|---|---|---|---|---|---|---|---|---|---|---|---|---|---|---|---|---|---|
| E | A | 2 | 1 | 0.50 | 0 | 1 | 0 | 0 | | K | A | 1 | 0 | 0.00 | 0 | 0 | 0 | 0 |
| E | B | 2 | 1 | 0.50 | 0 | 1 | 0 | 0 | | K | B | 1 | 0 | 0.00 | 0 | 0 | 0 | 0 |
| E | C | 2 | 2 | 1.00 | 0 | 1 | 1 | 0 | | K | C | 1 | 0 | 0.00 | 0 | 0 | 0 | 0 |
| E | D | 2 | 1 | 0.50 | 0 | 0 | 0 | 0 | | K | D | 1 | 0 | 0.00 | 0 | 0 | 0 | 0 |
| E | F | 2 | 0 | 0.00 | 0 | 0 | 0 | 0 | | K | E | 1 | 0 | 0.00 | 0 | 0 | 0 | 0 |
| E | G | 2 | 0 | 0.00 | 0 | 0 | 0 | 0 | | K | F | 1 | 0 | 0.00 | 0 | 0 | 0 | 0 |
| E | H | 2 | 0 | 0.00 | 0 | 0 | 0 | 0 | | K | G | 1 | 0 | 0.00 | 0 | 0 | 0 | 0 |
| E | I | 2 | 0 | 0.00 | 0 | 0 | 0 | 0 | | K | H | 1 | 0 | 0.00 | 0 | 0 | 0 | 0 |
| E | J | 2 | 0 | 0.00 | 0 | 0 | 0 | 0 | | K | I | 1 | 0 | 0.00 | 0 | 0 | 0 | 0 |
| E | K | 2 | 0 | 0.00 | 0 | 0 | 0 | 0 | | K | J | 1 | 0 | 0.00 | 0 | 0 | 0 | 0 |
| E | L | 2 | 0 | 0.00 | 0 | 0 | 0 | 0 | | K | L | 1 | 1 | 1.00 | 0 | 1 | 1 | 0 |
| F | A | 2 | 0 | 0.00 | 0 | 0 | 0 | 0 | | L | A | 1 | 0 | 0.00 | 0 | 0 | 0 | 0 |
| F | B | 2 | 0 | 0.00 | 0 | 0 | 0 | 0 | | L | B | 1 | 0 | 0.00 | 0 | 0 | 0 | 0 |
| F | C | 2 | 2 | 1.00 | 0 | 1 | 1 | 0 | | L | C | 1 | 0 | 0.00 | 0 | 0 | 0 | 0 |
| F | D | 2 | 0 | 0.00 | 0 | 0 | 0 | 0 | | L | D | 1 | 0 | 0.00 | 0 | 0 | 0 | 0 |
| F | E | 2 | 0 | 0.00 | 0 | 0 | 0 | 0 | | L | E | 1 | 0 | 0.00 | 0 | 0 | 0 | 0 |
| F | G | 2 | 0 | 0.00 | 0 | 0 | 0 | 0 | | L | F | 1 | 0 | 0.00 | 0 | 0 | 0 | 0 |
| F | H | 2 | 0 | 0.00 | 0 | 0 | 0 | 0 | | L | G | 1 | 0 | 0.00 | 0 | 0 | 0 | 0 |
| F | I | 2 | 0 | 0.00 | 0 | 0 | 0 | 0 | | L | H | 1 | 0 | 0.00 | 0 | 0 | 0 | 0 |
| F | J | 2 | 0 | 0.00 | 0 | 0 | 0 | 0 | | L | I | 1 | 0 | 0.00 | 0 | 0 | 0 | 0 |
| F | K | 2 | 0 | 0.00 | 0 | 0 | 0 | 0 | | L | J | 1 | 0 | 0.00 | 0 | 0 | 0 | 0 |
| F | L | 2 | 0 | 0.00 | 0 | 0 | 0 | 0 | | L | K | 1 | 1 | 1.00 | 0 | 1 | 1 | 0 |

FIG. 9

| Main data | | Subordinate data | | | | | | | | | | | |
|---|---|---|---|---|---|---|---|---|---|---|---|---|---|
| | | A | B | C | D | E | F | G | H | I | J | K | L |
| | Group | Gr1 | Gr1 | Gr1 | Gr1 | | | Gr2 | Gr2 | Gr2 | | | |
| A | Gr1 | | | | | | | | | | | | |
| B | Gr1 | Y | | Y | | | | | | | | | |
| C | Gr1 | | | | | | | | | | | | |
| D | Gr1 | ↓ | ↓ | Y↓ | ↓ | | | ↓ | ↓ | ↓ | | | |
| E | | | | | | | | | | | | | |
| F | | | | | | | | | | | | | |
| G | Gr2 | | | | | | | | | Y | | | |
| H | Gr2 | | | | | | | Y | | Y | | | |
| I | Gr2 | ↓ | ↓ | ↓ | ↓ | | | Y↓ | ↓ | ↓ | | | |
| J | | | | | | | | | | | | | |
| K | | | | | | | | | | | | | |
| L | | | | | | | | | | | | | |

| Data | Group |
|---|---|
| A | Gr1 |
| B | Gr1 |
| C | Gr1 |
| D | Gr1 |
| E | |
| F | |
| G | Gr2 |
| H | Gr2 |
| I | Gr2 |
| J | |
| K | |
| L | |

| Data | Group |
|---|---|
| A | Gr1 |
| B | Gr1 |
| C | Gr1 |
| D | Gr1 |
| E | Gr10003 |
| F | Gr10004 |
| G | Gr2 |
| H | Gr2 |
| I | Gr2 |
| J | Gr10005 |
| K | Gr10006 |
| L | Gr10007 |

| Data | Group |
|---|---|
| A | Gr1 |
| B | Gr1 |
| C | Gr1 |
| D | Gr1 |
| E | Gr1 |
| F | Gr1 |
| G | Gr2 |
| H | Gr2 |
| I | Gr2 |
| J | Gr9999 |
| K | Gr3 |
| L | Gr3 |

1030

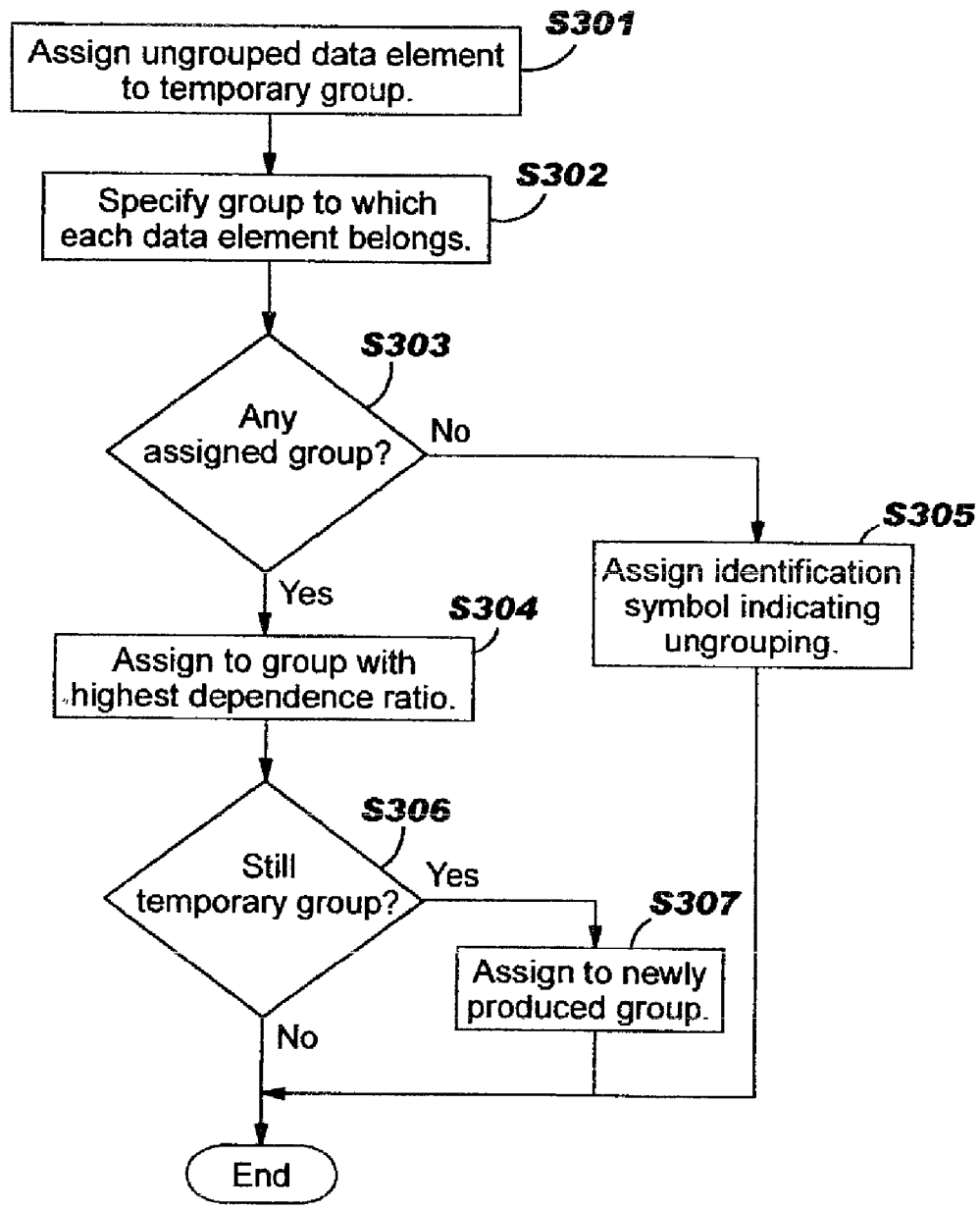

FIG. 12A

| Sample Number | Data | Group | Data ratio (α) | 1210 |
|---|---|---|---|---|
| 10007 | A | Gr1 | 0.33 | |
| 10007 | B | Gr1 | 0.33 | |
| 10007 | C | Gr1 | 0.33 | |
| 10007 | E | Gr10003 | - | |
| 10008 | C | Gr1 | 0.50 | |
| 10008 | D | Gr1 | 0.50 | |
| 10008 | E | Gr10003 | - | |

FIG. 12B

| Group | Dependence ratio (β) upon group | 1220 |
|---|---|---|
| Gr1 | 1.00 | |

FIG. 12C

| Sample Number | Data | Group | Data ratio (α) | 1230 |
|---|---|---|---|---|
| 10007 | C | Gr1 | 1.00 | |
| 10007 | F | Gr10004 | - | |
| 10007 | C | Gr1 | 1.00 | |
| 10007 | F | Gr10004 | - | |

FIG. 12D

| Group | Dependence ratio (β) upon group | 1240 |
|---|---|---|
| Gr1 | 1.00 | |

FIG. 12E

| Sample Number | Data | Group | Data ratio (α) | 1250 |
|---|---|---|---|---|
| 10022 | J | Gr10005 | - | |

FIG. 12F

| Sample Number | Data | Group | Data ratio (α) | 1260 |
|---|---|---|---|---|
| 10031 | K | Gr10006 | - | |
| 10031 | L | Gr10007 | 1.00 | |

FIG. 12G

| Group | Dependence ratio (β) upon group | 1270 |
|---|---|---|
| Gr10007 | 1.00 | |

FIG. 12H

| Sample Number | Data | Group | Data ratio (α) | 1280 |
|---|---|---|---|---|
| 10031 | K | Gr10007 | - | |
| 10031 | L | Gr10007 | - | |

| Main data | Subordinate data | Number of occurrences of main data | Number of occurrences of subordinate data | Number of simultaneous occurrences | Dependence ratio |
|---|---|---|---|---|---|
| A | B | 14 | 9 | 7 | 0.50 |
| A | C | 14 | 12 | 5 | 0.36 |
| A | E | 14 | 2 | 1 | 0.07 |
| A | D | 14 | 3 | 1 | 0.07 |
| A | F | 14 | 2 | 0 | 0.00 |

| Main data | Subordinate data | Number of occurrences of main data | Number of occurrences of subordinate data | Number of simultaneous occurrences | Dependence ratio |
|---|---|---|---|---|---|
| B | A | 9 | 14 | 7 | 0.78 |
| B | C | 9 | 12 | 6 | 0.67 |
| B | E | 9 | 2 | 1 | 0.11 |
| B | D | 9 | 3 | 1 | 0.11 |
| B | F | 9 | 2 | 0 | 0.00 |

| Main data | Subordinate data | Number of occurrences of main data | Number of occurrences of subordinate data | Number of simultaneous occurrences | Dependence ratio |
|---|---|---|---|---|---|
| C | B | 12 | 9 | 6 | 0.50 |
| C | A | 12 | 14 | 5 | 0.42 |
| C | D | 12 | 3 | 3 | 0.25 |
| C | E | 12 | 2 | 2 | 0.17 |
| C | F | 12 | 2 | 2 | 0.17 |

| Main data | Subordinate data | Number of occurrences of main data | Number of occurrences of subordinate data | Number of simultaneous occurrences | Dependence ratio |
|---|---|---|---|---|---|
| D | C | 3 | 12 | 3 | 1.00 |
| D | E | 3 | 2 | 1 | 0.33 |
| D | B | 3 | 9 | 1 | 0.33 |
| D | A | 3 | 14 | 1 | 0.33 |
| D | F | 3 | 2 | 0 | 0.00 |

FIG. 14E

| Main data | Subordinate data | Number of occurrences of main data | Number of occurrences of subordinate data | Number of simultaneous occurrences | Dependence ratio |
|---|---|---|---|---|---|
| E | C | 2 | 12 | 2 | 1.00 |
| E | D | 2 | 3 | 1 | 0.50 |
| E | B | 2 | 9 | 1 | 0.50 |
| E | A | 2 | 14 | 1 | 0.50 |
| E | F | 2 | 2 | 0 | 0.00 |

| Main data | Subordinate data | Number of occurrences of main data | Number of occurrences of subordinate data | Number of simultaneous occurrences | Dependence ratio |
|---|---|---|---|---|---|
| F | C | 2 | 12 | 2 | 1.00 |
| F | E | 2 | 2 | 0 | 0.00 |
| F | D | 2 | 3 | 0 | 0.00 |
| F | B | 2 | 9 | 0 | 0.00 |
| F | A | 2 | 14 | 0 | 0.00 |

| Main data | Subordinate data |
|---|---|
| A | B |
| B | A |
| C | B |
| D | C |
| E | C |
| F | C |

FIG. 16A

| Main data | Subordinate data | Number of occurrences of main data | Number of occurrences of subordinate data | Number of simultaneous occurrences | Dependence ratio |
|---|---|---|---|---|---|
| G | I | 9 | 6 | 6 | 0.67 |
| G | H | 9 | 4 | 4 | 0.44 |

FIG. 16B

| Main data | Subordinate data | Number of occurrences of main data | Number of occurrences of subordinate data | Number of simultaneous occurrences | Dependence ratio |
|---|---|---|---|---|---|
| H | G | 4 | 9 | 4 | 1.00 |
| H | I | 4 | 6 | 3 | 0.75 |

FIG. 16C

| Main data | Subordinate data | Number of occurrences of main data | Number of occurrences of subordinate data | Number of simultaneous occurrences | Dependence ratio |
|---|---|---|---|---|---|
| I | G | 6 | 9 | 6 | 1.00 |
| I | H | 6 | 4 | 3 | 0.50 |

FIG. 16D

| Main data | Subordinate data |
|---|---|
| G | I |
| H | G |
| I | G |

FIG. 17

| Level | Number of occurrences | Dependence ratio | Data |
|---|---|---|---|
| 1 | 9 | 0.67 | G |
| 2 | 6 | 1.00 | ⊢ I |
| 2 | 4 | 1.00 | ⊢ H |

| Main data | Subordinate data | Number of occurrences of main data | Number of occurrences of subordinate data | Number of simultaneous occurrences | Dependence ratio |
|---|---|---|---|---|---|
| K | L | 1 | 1 | 1 | 1.00 |

| Main data | Subordinate data | Number of occurrences of main data | Number of occurrences of subordinate data | Number of simultaneous occurrences | Dependence ratio |
|---|---|---|---|---|---|
| L | K | 1 | 1 | 1 | 1.00 |

| Main data | Subordinate data |
|---|---|
| K | L |
| L | K |

FIG. 19

| Level | Number of occurrences | Dependence ratio | Data |
|---|---|---|---|
| 1 | 1 | 1.00 | K |
| 2 | 1 | 1.00 | L |

FIG. 20

| Sample Number | Data | Group | Dependence ratio | Dependent group |
|---|---|---|---|---|
| 10001 | A | Gr1 | 1.00 | Gr1 |
| 10001 | C | Gr1 | | |
| 10002 | B | Gr1 | 1.00 | Gr1 |
| 10002 | C | Gr1 | | |
| 10003 | B | Gr1 | 1.00 | Gr1 |
| 10003 | C | Gr1 | | |
| 10004 | C | Gr1 | 1.00 | Gr1 |
| 10004 | D | Gr1 | | |
| 10005 | A | Gr1 | 1.00 | Gr1 |
| 10005 | B | Gr1 | | |
| 10005 | C | Gr1 | | |
| 10005 | D | Gr1 | | |
| 10006 | A | Gr1 | 1.00 | Gr1 |
| 10006 | B | Gr1 | | |
| 10007 | A | Gr1 | 1.00 | Gr1 |
| 10007 | B | Gr1 | | |
| 10007 | C | Gr1 | | |
| 10007 | E | Gr1 | | |
| 10008 | C | Gr1 | 1.00 | Gr1 |
| 10008 | D | Gr1 | | |
| 10008 | E | Gr1 | | |
| 10009 | C | Gr1 | 1.00 | Gr1 |
| 10009 | F | Gr1 | | |
| 10010 | C | Gr1 | 1.00 | Gr1 |
| 10010 | F | Gr1 | | |
| 10011 | C | Gr1 | 1.00 | Gr1 |
| 10012 | A | Gr1 | 1.00 | Gr1 |
| 10013 | G | Gr2 | 1.00 | Gr2 |
| 10013 | I | Gr2 | | |
| 10014 | G | Gr2 | 1.00 | Gr2 |
| 10014 | H | Gr2 | | |
| 10014 | I | Gr2 | | |
| 10015 | A | Gr1 | 1.00 | Gr1 |
| 10015 | B | Gr1 | | |
| 10016 | G | Gr2 | 1.00 | Gr2 |
| 10016 | H | Gr2 | | |
| 10016 | I | Gr2 | | |
| 10017 | A | Gr1 | 1.00 | Gr1 |
| 10018 | A | Gr1 | 1.00 | Gr1 |
| 10019 | G | Gr2 | 1.00 | Gr2 |
| 10020 | A | Gr1 | 1.00 | Gr1 |
| 10020 | B | Gr1 | | |
| 10020 | C | Gr1 | | |
| 10021 | G | Gr2 | 1.00 | Gr2 |
| 10021 | H | Gr2 | | |
| 10022 | J | Gr9999 | 1.00 | Gr9999 |
| 10023 | A | Gr1 | 1.00 | Gr1 |
| 10024 | A | Gr1 | 0.67 | Gr2 |
| 10024 | G | Gr2 | 0.33 | Gr1 |
| 10024 | I | Gr2 | | |
| 10025 | A | Gr1 | 1.00 | Gr1 |
| 10025 | B | Gr1 | | |
| 10025 | C | Gr1 | | |
| 10026 | A | Gr1 | 1.00 | Gr1 |
| 10027 | G | Gr2 | 1.00 | Gr2 |
| 10028 | G | Gr2 | 1.00 | Gr2 |
| 10028 | H | Gr2 | | |
| 10028 | I | Gr2 | | |
| 10029 | A | Gr1 | | |
| 10029 | B | Gr1 | 1.00 | Gr1 |
| 10030 | G | Gr2 | 1.00 | Gr2 |
| 10030 | I | Gr2 | | |
| 10031 | K | Gr3 | 1.00 | Gr3 |
| 10031 | L | Gr3 | | |

| Sample Number | Dependent group |
|---|---|
| 10001 | Gr1 |
| 10002 | Gr1 |
| 10003 | Gr1 |
| 10004 | Gr1 |
| 10005 | Gr1 |
| 10006 | Gr1 |
| 10007 | Gr1 |
| 10008 | Gr1 |
| 10009 | Gr1 |
| 10010 | Gr1 |
| 10011 | Gr1 |
| 10012 | Gr1 |
| 10015 | Gr1 |
| 10017 | Gr1 |
| 10018 | Gr1 |
| 10020 | Gr1 |
| 10023 | Gr1 |
| 10025 | Gr1 |
| 10026 | Gr1 |
| 10029 | Gr1 |
| 10013 | Gr2 |
| 10014 | Gr2 |
| 10016 | Gr2 |
| 10019 | Gr2 |
| 10021 | Gr2 |
| 10024 | Gr2 |
| 10027 | Gr2 |
| 10028 | Gr2 |
| 10030 | Gr2 |
| 10031 | Gr3 |
| 10022 | Gr9999 |

| | Data association diagram — 2200 | | | | | |
|---|---|---|---|---|---|---|
| Number of occurrences | A↳ B↳ C⊢ D ⊢ E ⊢ F | | | | | |
| | 13/14 | 9 | 12 | 3 | 2 | 2 |
| Sample Number | | | | | | |
| 10001 | ● | | ● | | | |
| 10002 | | ● | ● | | | |
| 10003 | | ● | ● | | | |
| 10004 | | | ● | ● | | |
| 10005 | ● | ● | ● | ● | | |
| 10006 | ● | ● | | | | |
| 10007 | ● | ● | ● | | ● | |
| 10008 | | | ● | ● | ● | |
| 10009 | | | ● | | | ● |
| 10010 | | | ● | | | ● |
| 10011 | | | ● | | | |
| 10012 | ● | | | | | |
| 10015 | ● | ● | | | | |
| 10017 | ● | | | | | |
| 10018 | ● | | | | | |
| 10020 | ● | ● | ● | | | |
| 10023 | ● | | | | | |
| 10025 | ● | ● | ● | | | |
| 10026 | ● | | | | | |
| 10029 | ● | ● | | | | |

FIG. 23A

| Data | Number of occurences of data | Group | 2310 |
|---|---|---|---|
| A | 14 | Gr1 |
| B | 9 | Gr1 |
| C | 12 | Gr1 |
| D | 3 | Gr1 |
| E | 2 | Gr1 |
| F | 2 | Gr1 |
| G | 9 | Gr2 |
| H | 4 | Gr2 |
| I | 6 | Gr2 |
| J | 1 | Gr9999 |
| K | 1 | Gr3 |
| L | 1 | Gr3 |

FIG. 23B

| Group | Number of occurrences of data | 2320 |
|---|---|---|
| Gr1 | 42 |
| Gr2 | 19 |
| Gr3 | 2 |
| Gr9999 | 1 |

FIG. 24

| (i) Data | (ii) Data | Group of data | Group of data | Number of simultaneous occurrences |
|---|---|---|---|---|
| A | B | Gr1 | Gr1 | 7 |
| A | C | Gr1 | Gr1 | 5 |
| A | D | Gr1 | Gr1 | 1 |
| A | E | Gr1 | Gr1 | 1 |
| A | F | Gr1 | Gr1 | 0 |
| A | G | Gr1 | Gr2 | 1 |
| A | H | Gr1 | Gr2 | 0 |
| A | I | Gr1 | Gr2 | 1 |
| A | J | Gr1 | Gr9999 | 0 |
| A | K | Gr1 | Gr3 | 0 |
| A | L | Gr1 | Gr3 | 0 |
| B | C | Gr1 | Gr1 | 6 |
| B | D | Gr1 | Gr1 | 1 |
| B | E | Gr1 | Gr1 | 1 |
| B | F | Gr1 | Gr1 | 0 |
| B | G | Gr1 | Gr2 | 0 |
| B | H | Gr1 | Gr2 | 0 |
| B | I | Gr1 | Gr2 | 0 |
| B | J | Gr1 | Gr9999 | 0 |
| B | K | Gr1 | Gr3 | 0 |
| B | L | Gr1 | Gr3 | 4 |
| C | D | Gr1 | Gr1 | 3 |
| C | E | Gr1 | Gr1 | 2 |
| C | F | Gr1 | Gr1 | 2 |
| C | G | Gr1 | Gr2 | 0 |
| C | H | Gr1 | Gr2 | 0 |
| C | I | Gr1 | Gr2 | 0 |
| C | J | Gr1 | Gr9999 | 0 |
| C | K | Gr1 | Gr3 | 0 |
| C | L | Gr1 | Gr3 | 0 |
| D | E | Gr1 | Gr1 | 1 |
| D | F | Gr1 | Gr1 | 0 |
| D | G | Gr1 | Gr2 | 0 |
| D | H | Gr1 | Gr2 | 0 |
| D | I | Gr1 | Gr2 | 0 |
| D | J | Gr1 | Gr9999 | 0 |
| D | K | Gr1 | Gr3 | 0 |
| D | L | Gr1 | Gr3 | 0 |
| E | F | Gr1 | Gr1 | 0 |
| E | G | Gr1 | Gr2 | 0 |
| E | H | Gr1 | Gr2 | 0 |
| E | I | Gr1 | Gr2 | 0 |
| E | J | Gr1 | Gr9999 | 0 |
| E | K | Gr1 | Gr3 | 0 |
| E | L | Gr1 | Gr3 | 0 |
| F | G | Gr1 | Gr2 | 0 |
| F | H | Gr1 | Gr2 | 0 |
| F | I | Gr1 | Gr2 | 0 |
| F | J | Gr1 | Gr9999 | 0 |
| F | K | Gr1 | Gr3 | 0 |
| F | L | Gr1 | Gr3 | 0 |
| G | H | Gr2 | Gr2 | 4 |
| G | I | Gr2 | Gr2 | 6 |
| G | J | Gr2 | Gr9999 | 0 |
| G | K | Gr2 | Gr3 | 0 |
| G | L | Gr2 | Gr3 | 0 |
| H | I | Gr2 | Gr2 | 3 |
| H | J | Gr2 | Gr9999 | 0 |
| H | K | Gr2 | Gr3 | 0 |
| H | L | Gr2 | Gr32 | 0 |
| I | J | Gr2 | Gr9999 | 0 |
| I | K | Gr2 | Gr3 | 0 |
| I | L | Gr2 | Gr3 | 0 |
| J | K | Gr9999 | Gr3 | 0 |
| J | L | Gr9999 | Gr3 | 0 |
| K | L | Gr3 | Gr3 | 1 |

| Group | Group | Number of simultaneous occurrences |
|---|---|---|
| Gr1 | Gr1 | 30 |
| Gr1 | Gr2 | 2 |
| Gr1 | Gr3 | 0 |
| Gr1 | Gr9999 | 0 |
| Gr2 | Gr2 | 13 |
| Gr2 | Gr3 | 0 |
| Gr2 | Gr9999 | 0 |
| Gr3 | Gr3 | 1 |
| Gr9999 | Gr3 | 0 |

| Group | Group | Number of simultaneous occurrences |
|---|---|---|
| Gr1 | Gr2 | 2 |
| Gr1 | Gr3 | 0 |
| Gr1 | Gr9999 | 0 |
| Gr2 | Gr3 | 0 |
| Gr2 | Gr9999 | 0 |
| Gr3 | Gr9999 | 0 |

FIG. 26

| Main data | Subordinate data | Number of occurrences of main data | Number of simultaneous occurrences | Dependence ratio |
|---|---|---|---|---|
| Gr1 | Gr2 | 42 | 2 | 0.05 |
| Gr2 | Gr1 | 19 | 2 | 0.11 |

| Level | Number of occurrences | Dependence ratio | Group |
|---|---|---|---|
| 1 | 42 | 0.05 | Gr1 |
| 2 | 19 | 0.11 | Gr2 |
| 1 | 2 | N/A | Gr3 |
| 1 | 1 | N/A | Gr9999 |

| Data | Number of occurrences | Diameter |
|---|---|---|
| A | 14 | 26.2 |
| B | 9 | 21.0 |
| C | 12 | 24.2 |
| D | 3 | 12.1 |
| E | 2 | 9.8 |
| F | 2 | 9.8 |

FIG. 29B

| Data | Summation of radius | Dependence ratio | $\sqrt{1/\text{dependence ratio}}$ | Length of link |
|---|---|---|---|---|
| A-B | 23.60 | 0.78 | 1.13 | 26.72 |
| B-C | 22.62 | 0.50 | 1.41 | 32.00 |
| C-D | 18.19 | 1.00 | 1.00 | 18.19 |
| C-E | 17.07 | 1.00 | 1.00 | 17.07 |
| C-F | 17.07 | 1.00 | 1.00 | 17.07 |

FIG. 29C

| Link | Number of occurrences | Occupancy angle | Link-to-link angle |
|---|---|---|---|
| "C-B" | 23 | 276 | |
| "C-E" | 2 | 24 | 150 |
| "C-D" | 3 | 36 | 30 |
| "C-F" | 2 | 24 | 30 |
| Total | 30 | 360 | 150 |

FIG. 30

| Level | Number of occurrences | Dependence ratio | Data | | 3000 |
|---|---|---|---|---|---|
| 1 | 14 | 0.36 | A | | |
| 3 | 12 | 0.42 | | C | |

METHOD, APPARATUS, AND COMPUTER PROGRAM PRODUCT FOR LOCATING DATA IN LARGE DATASETS

CROSS REFERENCE TO RELATED APPLICATIONS

The present application is a continuation application of application Ser. No. 10/319,271, filed Dec. 13, 2002, now U.S. Pat. No. 7,333,973, issued Feb. 19, 2008.

FIELD OF THE INVENTION

The present invention relates to a data analysis system for analyzing data sets that have one-to-many relations among data elements.

BACKGROUND

Keywords or classification codes are conventionally used to search for specific information contained in an enormous amount of data. For example, in the patent literature, each application includes the application number, the name of the invention, the applicant's name, the inventor's name, and the IPC classification. A specific patent application may be located in a database using the title of the invention or the name of the applicant as keywords, for example, or using the application number or IPC classification. The intended patent application can be found reliably if the keyword or classification code is suitable.

However, with the conventional method as described above, it is very difficult to obtain information that satisfies multiple criteria. For example, consider the case of identifying the inventors in each technical field from a database of patent publications. In such a case, if the number of subject inventors is very large, or if some of the inventors are active in multiple technical fields, it is difficult to obtain precise information simply by using keywords or classification codes. Also, if the inventors are grouped, and the groups include inventors with low frequency of occurrence, the number of inventors contained in a specific group may be too large. Furthermore, it is almost impossible to determine the relation between inventors in a technical field, or to deduce relationships of primary and secondary contributors to a given field.

Therefore, when such information is needed, the data is often arranged manually. Of course, this takes a lot of time, and is inefficient and expensive. Also, there is a lot of room for personal judgment during the analysis, which may therefore provide different results depending on who does the analysis.

The above example is couched in the field of patents, as a descriptive convenience. In recent years, however, it has become increasingly important in general to analyze data drawn from enormous data sets, especially in the field of gene research. The present invention applies as well to such more general problems.

SUMMARY

A data analysis system according to the present invention for analyzing data with respect to a plurality of data elements or keywords comprises: a database for storing data, an analysis processing portion (means) for analyzing data elements based on the number of occurrences of a first data element and the number of simultaneous occurrences of a second data element with the first data element in the data set to be analyzed, and an output portion (means) for outputting results of the analysis. The number of simultaneous occurrences for all the combinations of data elements is obtained. Simultaneous occurrence means that the first data element and the second data element coexist in a sample or subset of the data.

Based on the number of simultaneous occurrences, the data elements can be divided into groups. That is, if the ratio of the number of simultaneous occurrences to the number of occurrences of the first data element (hereinafter referred to as a "dependence ratio") is greater than a predetermined value, the first data element and the second data element by definition belong to the same group of data elements.

Keywords may be considered in pairs. Two keywords are defined to belong to the same group if the number of data samples that contain both of the two keywords meets a predetermined threshold condition. This threshold may be the ratio of the number of simultaneous occurrences of the two keywords to the number of occurrences of one keyword (hereinafter referred to as a "dependence ratio").

In this manner, since relevant data elements are put in the same group only if their dependence ratio is greater than the predetermined value, it is possible to limit the size of the groups by adjusting the threshold appropriately.

The data analysis system may integrally comprise the analysis processing portion, the database, and the output portion, or the user may gain access to the analysis processing portion via a network such as an Internet or LAN to receive the analysis results. The analysis processing portion and the output portion may also be separate. Then, the display terminal which the user employs as the output portion comprises an interface, for requesting the data analysis by gaining access to the data analysis apparatus via the network, and accepting means, such as a data communication apparatus, for accepting the data analysis results via the network from the data analysis apparatus.

That is, the display terminal according to the present invention may use the interface to make a request via the network. The data analysis apparatus that receives the request performs the analysis and forwards the results to the display terminal. In the output portion, accepting means accept the analysis results via the network, and display means display the relation of the plurality of data elements in the form of a figure, based on the analysis results.

The figure may show hierarchy among the data elements as a tree structure. To create the tree, combinations of the data elements are examined, and the combination with highest dependence ratio is extracted. In the extracted combination, the subordinate relation between data elements is specified based on the dependence ratio. If the dependence ratio of data element B upon data element A is higher than the dependence ratio of data element A upon data element B, data element B depends upon data element A. That is, data element B is subordinate to data element A. Also, the subordinate relation can be specified, based on the number of occurrences of two data elements. In this case, a data element with a smaller number of occurrences depends upon a data element with a larger number of occurrences.

The display may represent the data elements as figures such as circles or balloons. The size of the figure may depend upon the number of occurrences of the represented data element, and the distance between the figures may depend upon the relation of the data elements. Herein, the relation of data elements may be a ratio of the number of simultaneous occurrences of two data elements to the number of occurrences of one data element.

The invention further includes a method for analyzing data, comprising a step of calculating a dependence ratio of one data element upon another data element in data samples to be analyzed, a step of grouping the data elements based on the dependence ratios, and a step of outputting the grouped results. Herein, two data elements belong to the same group, by definition, if their dependence ratio is greater than a predetermined value. Also, a subordinate relation between one data element and another may be specified, based on the ratio of the number of simultaneous occurrences to the number of occurrences of one data element.

The present invention also includes a program to instruct a computer to specify two relevant keywords, based on the occurrence of keywords in data stored in a database, and group the keywords. That is, if the keyword A and the keyword B are related, they are defined to belong to the same group. Moreover, if the keyword B and the keyword C are related, the keyword C is defined to belong to the same group of the keywords A and B.

BRIEF DESCRIPTION OF THE DRAWINGS

FIG. 3 is a table showing exemplary data;

FIG. 4 is a table showing the exemplary data expanded;

FIG. 5 is a table listing the number of occurrences of each data element;

FIG. 6 is a table listing the number of simultaneous occurrences of combinations of two data elements;

FIG. 7 is a table listing a dependence ratio and a determination result for the threshold;

FIG. 9 is a table for use in grouping;

FIGS. 10A-10C are tables listing grouped results;

FIG. 11 is a flowchart showing a process for assigning an ungrouped data element to a group;

FIGS. 12A-12H are tables showing the examination for specifying the group upon which the ungrouped data element depends;

FIGS. 14A-14G are tables showing stages of the examination made of a group;

FIGS. 16A-16D are tables showing stages of the examination of a group;

FIG. 17 shows analysis results in the form of tree;

FIGS. 18A-18C are tables showing stages of an examination of a group;

FIG. 19 shows analysis results in the form of tree;

FIG. 20 is a table listing the group upon which each data sample depends;

FIG. 21 is a table listing results of an examination of FIG. 20;

FIG. 22 is a table listing analysis results in the form of a tree, with the data elements constituting the data sample;

FIGS. 23A-23B are tables showing an examination of a relation between groups in order to output the analysis results in another form;

FIG. 24 is a table listing the number of simultaneous occurrences for a combination of two groups;

FIGS. 25A-25B are tables showing the results of examining the number of simultaneous occurrences for the combination of two groups;

FIG. 26 is a table listing a state where relevant groups are taken out and the dependence ratio is calculated;

FIG. 27 shows the analysis results of the relation between groups in the form of a tree;

FIGS. 29A-29C are tables listing the parameters required in producing a balloon figure;

FIG. 30 shows the results of examining the dependence ratio upon an indirectly relevant group;

DETAILED DESCRIPTION

The present invention will be described below with reference to the accompanying drawings.

Figure 1:
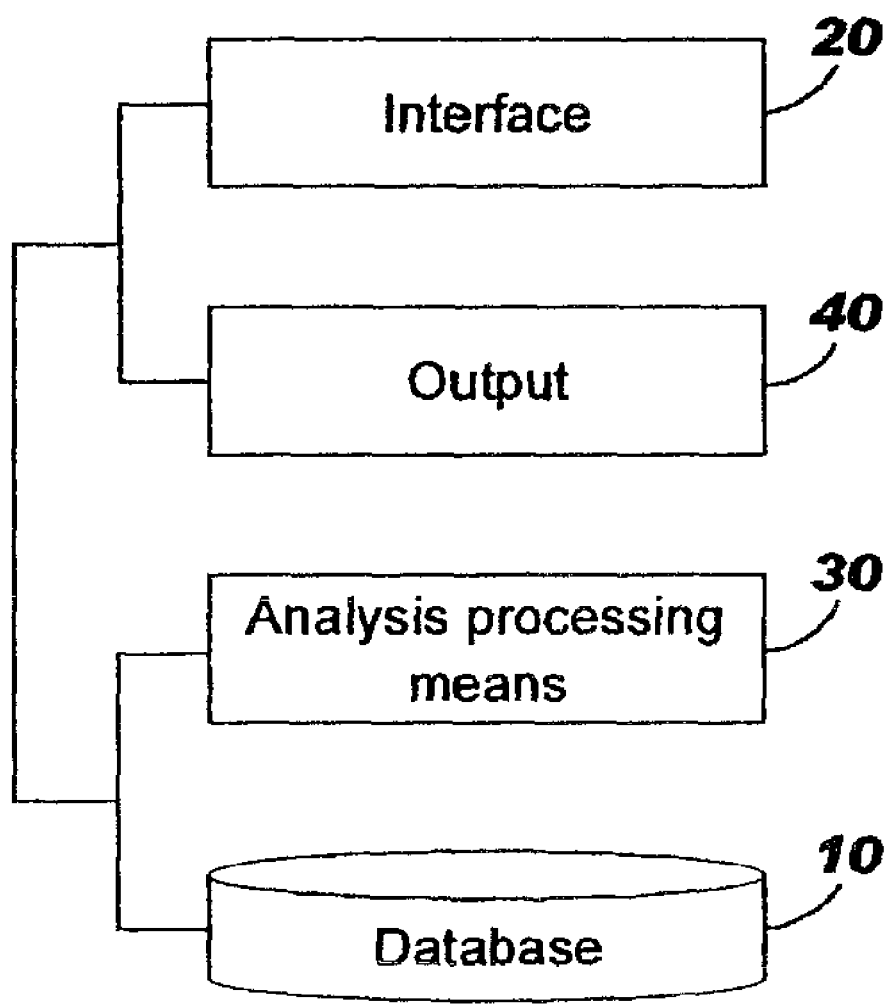
FIG. 1 is a diagram showing a configuration of a data analysis system according to an embodiment of the present invention.

FIG. 1 shows a configuration of a data analysis system according to an embodiment of the invention. As shown in FIG. 1, the data analysis system comprises a database 10 for storing the data, an interface 20, an analysis processing portion (analysis processing means) 30 for analyzing the data stored in the database 10, and an output portion 40 such as a display or a printer.

In this data analysis system, a user requests data analysis using the interface 20. The analysis processing portion 30 accepts the request, analyzes the data stored in the database 10, and forwards the analysis results to the output portion 40, which then outputs the analysis results to the user in the form of a display or printout.

Figure 2:
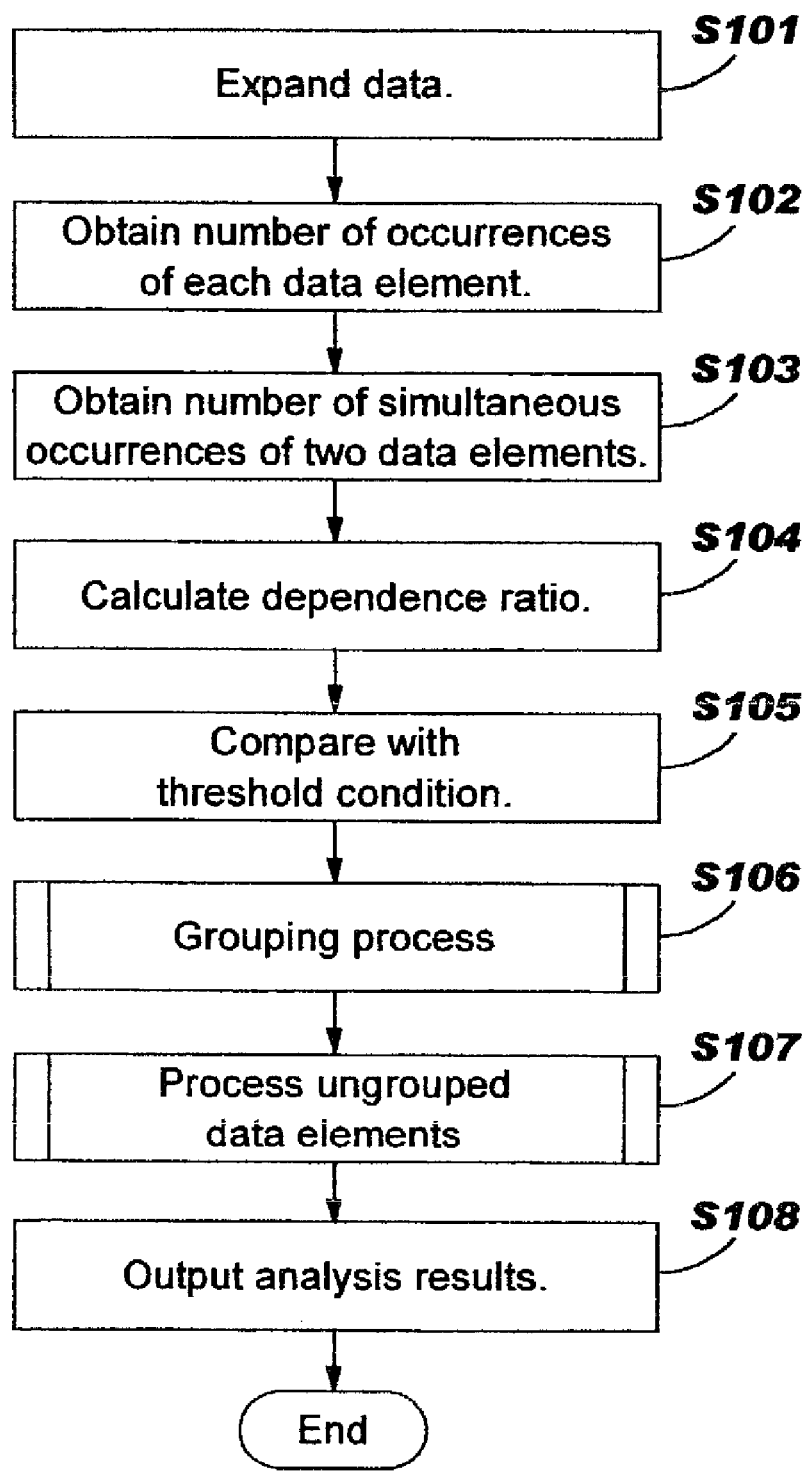
FIG. 2 is a flowchart showing a process flow of data analysis.

The analysis processing portion 30 may be implemented by a preinstalled program and a CPU for executing the program. An analytic method performed by the analysis processing portion 30 will be described below in sequence with reference to the flowchart shown in FIG. 2.

FIG. 3 illustrates an example of data 300 stored in the database 10. As shown in FIG. 3, the data 300 comprises data samples, each having a sample number. For each sample number ("10001" to "10031" in the figure) appended to each data sample, the related data elements or keywords (A to L) are listed in the data fields 1 to 4 ("data 1", "data 2", "data 3" and "data 4") in one-to-many form.

As a specific example, if the data is related to patent publications, the sample number may be the application number, and the data element may be the inventor. If the data is related to genome research, the sample number may be, for example, the sample provider, and the data elements may be diseases of the sample provider or genetic features of the sample provider.

When the user starts the data analysis, the analysis processing portion 30 first reads the data 300 from the database 10, and expands it to one-to-one form. At this time, the data 300 as shown in FIG. 3 is normalized and expanded one-to-one as shown in FIG. 4 (step S101 of FIG. 2).

For example, in FIG. 3, the data sample of sample number "10001" is associated with the data elements A and C. This is transformed into the data structure 400 in which sample number "10001" and data element A, and sample number "10001" and data element C, are associated individually as shown in FIG. 4.

Subsequently, the analysis processing portion 30 calculates the number of occurrences of each data element (step S102). For example, data element A occurs 14 times in sample numbers "10001" to "10031." FIG. 5 shows an occurrence table 500 representing the number of occurrences of each data element.

The analysis processing portion 30 combines, by twos, the data elements appearing in the table 300 of FIG. 3, and calculates the number of data samples in which each combination occurs simultaneously (step S103). FIG. 6 shows a simultaneous occurrence table 600 indicating the number of simultaneous occurrences for each combination of two data elements. For example, the data elements A and B occur simultaneously in seven data samples; consequently, the number of simultaneous occurrences is seven in the table 600 of FIG. 6.

Then, the dependence ratio of the data elements is calculated based on the number of occurrences of each data element (table 500, FIG. 5) and the number of simultaneous occurrences for each combination of data elements (table 600, FIG. 6) (step S104). Herein, the dependence ratio of data elements is a ratio in which one data element depends on another data element, in other words, the ratio of the number of simultaneous occurrences of a first data element and a second data element to the number of occurrences of the first data element.

For example, the ratio of the number of simultaneous occurrences wherein A and B are joint inventors, to the total number of occurrences of inventor A is calculated. This is the dependence ratio by which inventor A depends on inventor B.

FIG. 7 shows a table 700 of the dependence ratios between data elements, calculated as described above. For example, in calculating the dependence ratio of data element A upon data element B in the tables 500 and 600 of FIGS. 5 and 6, because the number of occurrences of data element A is 14 and the number of simultaneous occurrences of data elements A and B is 7, the dependence ratio of data element A as the main data upon data element B as the subordinate data is equal to 7÷14=0.50.

Further, a check is made to determine whether the number of occurrences of the data element as the main data, the number of simultaneous occurrences of the main data and subordinate data, and the calculated dependence ratio satisfy the respective predetermined threshold conditions (step S105).

For the number of occurrences of the data element as main data, the threshold value is set to 3 in this embodiment. A check is made to determine whether the number of occurrences of the data element as main data is greater than this threshold value. If the condition is satisfied, the flag is set to "1", and otherwise to "0". The purpose of this threshold value is to exclude data samples with small numbers of occurrences from the subsequent processing and to illustrate trends in the data without being caught up in the details.

For the number of simultaneous occurrences of the main data and the subordinate data, the threshold value is set to "1" in this embodiment. A check is made to determine whether the number of simultaneous occurrences is greater than the threshold value. If the condition is satisfied, the flag is set to "1", and otherwise to "0". The purpose of this threshold is to exclude data samples with small numbers of simultaneous occurrences, even if the dependence ratio satisfies the threshold, as will be described later.

For the dependence ratio, the threshold is set to 0.60 in this embodiment. A check is made to determine whether the dependence ratio of main data upon subordinate data is greater than the threshold value. If the condition is satisfied, the flag is set to "1", and otherwise to "0". The purpose of this threshold is to employ data with high dependence ratios, namely data elements of high relevance, in the subsequent processing.

Based on the three flags, the conditional flag is set to "1" for any combination of data elements in which all the conditions of thresholds are satisfied, namely, all the three flags are "1"; the conditional flag is set to "0" for other combinations.

In FIG. 7, in a combination of data element A as the main data and data element B as the subordinate data, the number of occurrences of data element A as the main data is 14, which is greater than the first threshold 3. Consequently, the first flag is set to "1". Also, because the number of simultaneous occurrences of data element A as the main data and data element B as the subordinate data is 7, which is greater than the second threshold 1, the second flag is set to "1". Because the dependence ratio of data element A as the main data upon data element B is 0.50, which is less than the third threshold 0.60, the condition is not satisfied, and the third flag remains "0". The flag is "0" for one of the three conditions; consequently, the conditional flag remains "0".

For example, in a combination of data element B as the main data and data element A as the subordinate data, the number of occurrences of data element B as the main data is 9, which is greater than the first threshold 3. Consequently, the first flag is set to "1". Also, because the number of simultaneous occurrences of data element B as the main data and data element A as the subordinate data is 7, which is greater than the second threshold 1, the second flag is set to "1". Because the dependence ratio of data element B as the main data upon data element A is 0.78, which is greater than the third threshold 0.60, the third condition is satisfied, and the flag is set to "1". Thus all three of the flags are equal to "1"; consequently, the conditional flag is set to "1".

In this embodiment, when the three flags satisfy the AND condition, the conditional flag is set to "1", but the invention is not limited thereto.

Figure 8:
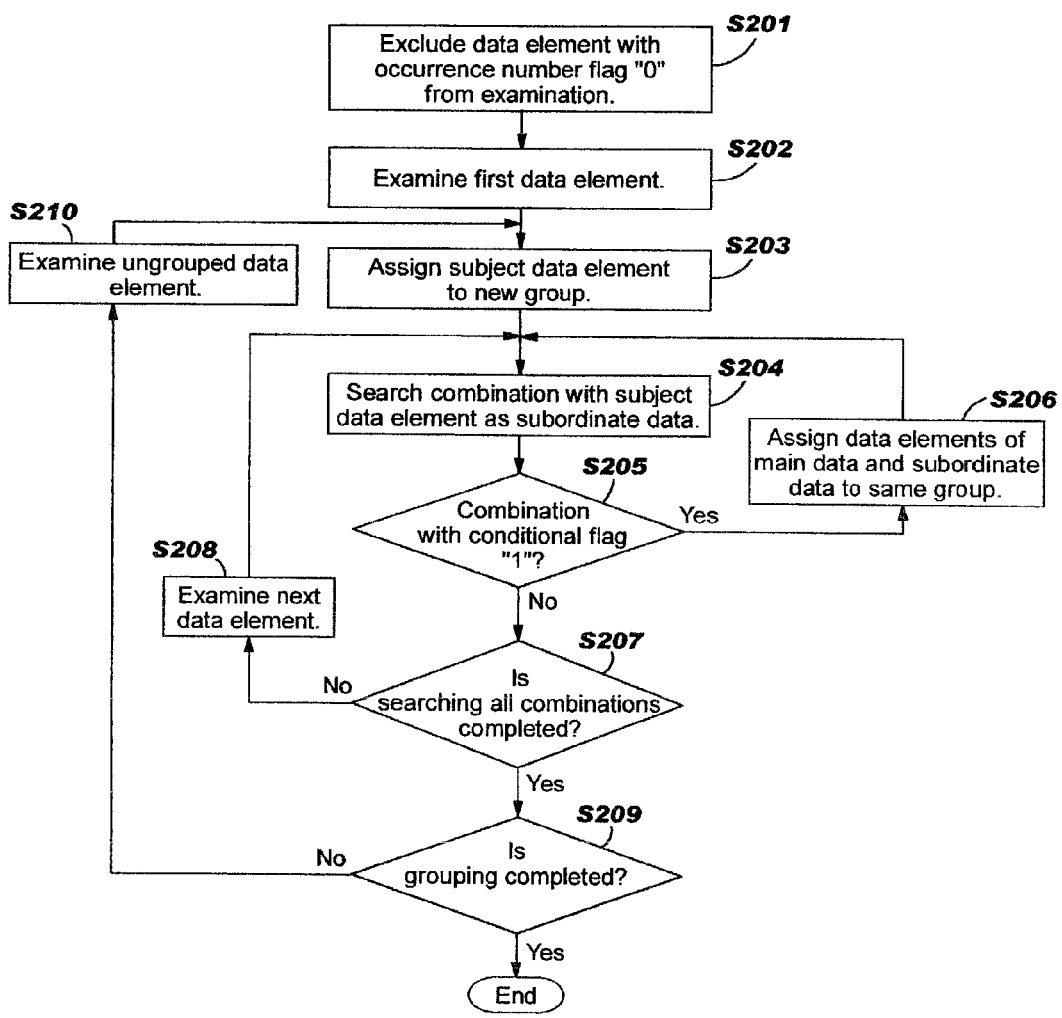
FIG. 8 is a flowchart showing a grouping process.

Based on the conditional flag set up in the manner described above, the analysis processing portion 30 groups the data elements (step S106). FIG. 8 is a flowchart showing the grouping process. FIG. 9 is an example of a grouping table 900 listing the results of grouping in accordance with the flowchart of FIG. 8. In the table 900, "Y" indicates a combination for which the conditional flag is set to "1".

The flag for the number of occurrences of data element as the main data is checked, and if the flag is "0", the data element is excluded from the examination (step S201). For example, in the table 700 of FIG. 7, the data elements E, F, J, K and L have the flag "0", and are therefore excluded from the examination.

In this example, the data elements A, B, C, D, G, H and I, other than the data elements E, F, J, K and L that are excluded from the examination, are examined successively in a predetermined order, such as in alphabetical order.

Subsequently, combinations of each of the data elements to be examined with other data element are searched successively. If the dependence ratio is greater than the threshold, the data element that is a partner of the combination is defined as being in the same group.

Initially, the first data element (data element A in the example of FIG. 9) is made the examination subject (step S202), and set as a new group (first group "Gr1") (step S203).

Subsequently, the combination having the first data element (data element A) as subordinate data is searched (step S204). When the combination with the conditional flag "1" is hit, the subject data element as subordinate data and the data element as main data occurring simultaneously therewith are defined as the same group (steps S205 and S206). In the example of FIG. 9, the conditional flag "1" is set in the combination having data element B as main data. Thus, data element B is defined as the group "Gr1".

Thereafter, returning to step S204, the combination having the subject data element as the subordinate data is searched consecutively until the combination with the conditional flag "1" is not hit. In the example of FIG. 9, there is no combination in which the dependence ratio of data element A is greater than the threshold. Searching the combination with data element A as subordinate data is ended.

When searching the combination having the subject data element as the subordinate data is ended, the next data element is made the examination subject (steps S207 and S208), and the combination having the new subject data element as the subordinate data is searched, wherein the processing from step S204 to step S207 is repeated.

In the example of FIG. 9, when the combination is searched having data element B for the new examination subject as the subordinate data, no combination is found with the conditional flag "1".

Further, the combination with data element C as the subordinate data and data element B as the main data has a dependence ratio greater than the threshold value. Consequently, since data element B as the main data is already assigned to the group "Gr1", data element C is assigned to group "Gr1".

The search is continued while the examination subject is changed. The combination of data element with data element D as the main data has a dependence ratio greater than the threshold. Since data element C is already assigned to the group "Gr1", data element D is also assigned to group "Gr1".

Since there is no other combination in which the dependence ratio of data element C is greater than the threshold, searching for data element C is ended.

Searching for the data elements D, G, H and I is similarly performed; but since there is no combination that includes the data elements A, B, C and D that are assigned to the group "Gr1", searching the group "Gr1" is completed.

In this manner, once all the combinations of data elements as the examination subject are examined, a check is made to determine whether any data element remains that is not grouped (step S209). If so, the first data element of the remaining data elements is made the examination subject (step S210), and the examination continues, returning to step S203. In the example of FIG. 9, the data elements A, B, C and D are already assigned to the group "Gr1", but the data elements G, H and I are not yet assigned to the group. Thus, of the remaining data elements, data element G is next examined as the subject. Herein, at step S203, the subject data element G is assigned to a new group "Gr2".

Thereafter, the processing from step S204 to step S208 is repeated. That is, with data element G as the subordinate data, a search is made for the combination in which the dependence ratio is greater than the threshold. Then, the conditional flag "1" is set in the combination for which data element H is the main data. Thus, data element H is set as the group "Gr2".

When data element G is the subordinate data and data element I is the main data, the dependence ratio is greater than the threshold. Thus, data element I is assigned to group "Gr2".

Moreover, with data element H as the subordinate data, a search is made for the combination in which the dependence ratio is greater than the threshold. Since there is no combination with the conditional flag "1", the combination with data element I as subordinate data is subsequently searched.

With data element I as the subordinate data and data element G as the main data, the dependence ratio is greater than the threshold. However, since data element G is already assigned to the group "Gr2", no further processing is required.

With data element I as the subordinate data and data element H as the main data, the dependence ratio is greater than the threshold. However, since data element H is already assigned to group "Gr2", no further processing is required.

In addition, since there is no other combination in which the dependence ratio is greater than the threshold, with data element G as the subordinate data, searching for data element G is ended.

All the subject data elements have now been assigned to the groups; consequently, the grouping process is ended.

As a result of this process, as shown in FIG. 9 and FIG. 10A, the data elements A, B, C and D are assigned to the group "Gr1," and data elements G, H and I are assigned to the group "Gr2."

In this manner, the data elements can be grouped, employing the dependence ratio.

As listed in table 700 of FIG. 7, data element E occurs simultaneously in the combination with data elements A, B, C and D, but because the number of occurrences of data element E is small, i.e., below the threshold, data element E is excluded from the grouping. In this way, data elements with small frequencies of occurrence are ignored at this time. Consequently, it is possible to prevent a huge number of data elements from being classified into the same group.

Also, in the table 700 of FIG. 7, data element G that is finally assigned to the group "Gr2" occurs simultaneously in the combination with data element A assigned to the group "Gr1." However, because the dependence ratio is small, i.e., below the threshold, data element G is excluded from the grouping.

When the data elements are grouped in the above way, data elements not belonging to any group may remain, because the number of occurrences of data is small or the dependence ratio is small. Thus, a process for specifying the group that those ungrouped data elements belong to is performed (step S107) The following process is optional in accordance with a user's selection. FIG. 11 is a flowchart showing the detailed flow of this process. This process is repeated until, for each subject data element, there are no data elements to be processed.

Each of the ungrouped data elements is assigned to a temporary group (step S301).

FIG. 10A shows a table 1010 that gives the data element and the group to which the data element belongs according to the above grouping process. Data elements A, B, C and D are assigned to the group "Gr1", data elements G, H and I are assigned to the group "Gr2", and data elements E, F, J, K and L are not assigned to any group.

As shown in table 1020 of FIG. 10B, the data elements E, F, J, K and L are assigned to the temporary groups "Gr10003", "Gr10004", "Gr10005", "Gr10006" and "Gr10007", respectively.

Subsequently, the group that each individual subject data element belong to is specified by examining the data sample including individual data elements assigned to the temporary group (step S302).

First, in the data sample including the subject data element, the ratio (α) of other data elements occurring simultaneously with the subject data element is calculated as:

Ratio (α)=1/(number of data elements included in data sample−number of data elements belonging to the same group of the subject data element).

When the denominator is equal to zero, the data element is not assigned to any existing group (jump to step S306).

For example, the table 1210 of FIG. 12A describes the examination of the subject data element E. In the data of sample number "10007", the ratio of other data elements A, B and C occurring simultaneously with data element E is calculated as: Ratio (α)=1/(4−1)=0.33. Also, in the data sample "10008", the ratio of data elements C and D occurring simultaneously with the subject data element E is calculated as: Ratio (α)=1/(3−1)=0.50.

Then, in the entire data sample including the subject data element, the dependence ratio of the subject data element upon each of the existing groups is calculated, based on the groups that other data elements occurring simultaneously with the subject data element belong to. Here, the data elements that belong to the same group of the subject data element are excluded.

For each group, the ratios (α) for the data elements assigned to that group are added, and the resulting sum is divided by the number of the subject data sample. For example, in the example of FIG. 12A, other data elements A, B and C occurring simultaneously with the subject data element E in the data sample "10007" and the data elements C and D in the data sample "10008", are all assigned to the group "Gr1". Therefore, the ratio (α) for the data elements A, B, C and D assigned to the group "Gr1" are added up, and the added value Σ(α) is calculated as: Σ(α)=0.33+0.33+0.33+0.50+0.50=2.00

As shown in table 1220 of FIG. 12B, the number of the subject data sample is two, including data sample "10007" and "10008." The dependence ratio (β) of the subject data element E upon the group "Gr1" may be calculated as:

β=Σ(α)/(number of data sample)=2.00/2=1.00

In this manner, for the subject data element, the group with the highest dependence ratio is assigned as the group that the subject data element belongs to (steps S303 and S304).

In FIG. 10B, the temporary group is replaced with the newly assigned group. At this time, if there is no newly assigned group, the identification number indicating no-group is assigned (step S305). Thereby, the process for assigning the subject data element to the group is completed.

In the example of FIG. 12A, for the subject data element E, only the dependence ratio (β) upon one group "Gr1" is calculated, and data element E is naturally assigned to this group. The group of data element E is replaced with "Gr1", as shown in FIG. 10C.

Tables 1230 and 1240 of FIGS. 12C and 12D describe the examination of the subject data element F in the same manner as above. For data element F, the dependence ratio (β) of the data sample "10009" and "10010" upon the group "Gr1" is 1.00. Accordingly, the group of data element F is replaced with "Gr1," as shown in FIG. 10C.

Table 1250 of FIG. 12E describes the examination of data element J. Data element J is single, without any other effective groups, and is therefore assigned to the group with the identification number "Gr9999," indicating no-group. The group of data element J is replaced with the "Gr9999", as shown in FIG. 10C.

Tables 1260 and 1270 of FIGS. 12F and 12G describe the examination of data element K. For data element K, the dependence ratio (β) upon the temporary group "Gr10007," which is assigned temporarily to data element L in the data sample "10031," is 1.00. Accordingly, the group of data element K is replaced with "Gr10007".

Table 1280 of FIG. 12H describes the examination of data element L. For data element L, there is no effective dependence ratio (β), because the temporary group "Gr10007" assigned to data element K in the data sample "10031" corresponds to the same group as the subject data element. Because the data element is not single, the process ends.

In this manner, new groups are created for data elements that are assigned neither to the existent group nor to the no-group category, but instead remain in the temporary group (steps S306 and S307). For example, data elements K and L are not assigned to any of the groups "Gr1", "Gr2" and "Gr9999", but instead remain in the temporary group "Gr10007". Hence, the temporary group is replaced with the new group "Gr3", as shown in FIG. 10C.

In this manner, the data elements are effectively decomposed into groups of appropriate sizes that are obtained by setting the threshold suitably, particularly when the data set is especially large.

Figure 13:
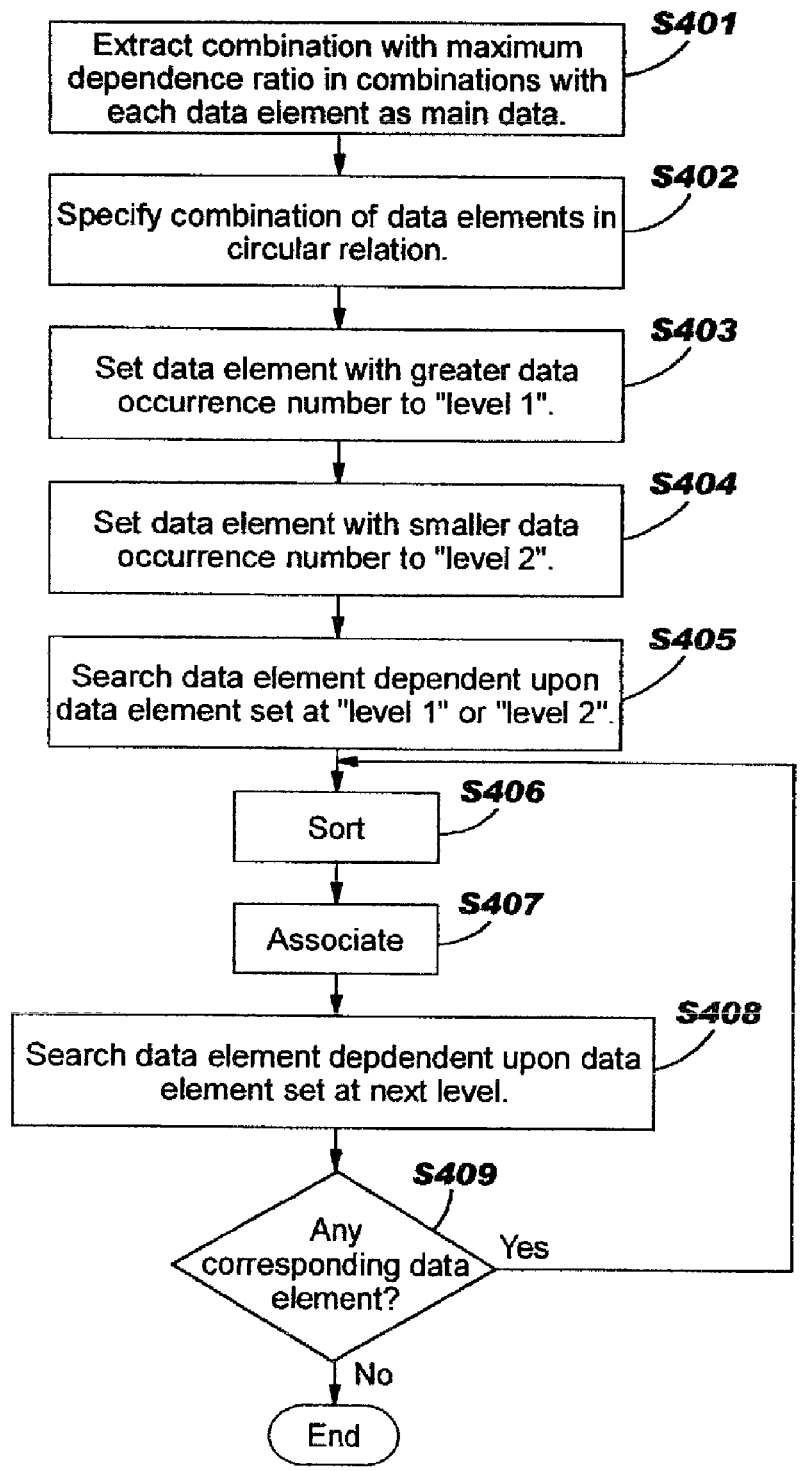
FIG. 13 is a flowchart showing a process for specifying a correlation of data elements for each group.

Next, the data to be output by the output portion 40 is created, based on the grouping process that is performed by the analysis processing portion 30 as described above (step S108). Although many suitable structures may be used, in this embodiment the correlation of data elements is represented in the form of a tree. FIG. 13 is a flowchart showing the process flow for displaying the tree.

For this purpose, the subordinate relation of data elements assigned to each group is examined. First of all, when the subject data element assigned to the group is the main data and another data element assigned to the same group is the subordinate data, the number of occurrences of the main data, the number of occurrences of the subordinate data, the number of simultaneous occurrences of the main data and the subordinate data, and the dependence ratio of the main data upon the subordinate data are acquired from table 700 of FIG. 7. The data elements are sorted in descending order according to their dependence ratios. Then, if there are multiple combinations with equal dependence ratios, the data elements are sorted in ascending order of priority by the number of occurrences of the subordinate data, and the subordinate data names are sorted in ascending alphabetic order. The combination with highest dependence ratio is then extracted. The subordinate data in the extracted combination is the data element upon which the main data element is most highly dependent (step S401).

Table 1410 of FIG. 14A describes the examination of main data element A of group "Gr1" when other data elements B, C, D, B and F assigned to the same group "Gr1" are the subordinate data. Herein, the dependence ratio 0.50 for the combination when data element B is the subordinate data is listed at the uppermost level.

Table 1420 of FIG. 14B describes the examination of data element B assigned to the group "Gr1" in the same way as above, in which the combination when data element A is the subordinate data is listed at the uppermost level. Table 1430 of FIG. 14C describes the examination of data element C, in which the combination when data element B is the subordinate data is listed at the uppermost level. Table 1440 of FIG. 14D describes the examination of data element D, in which the combination when data element C is the subordinate data is listed at the uppermost level. Table 1450 of FIG. 14E describes the examination of data element E, in which the combination when data element C is the subordinate data is listed at the uppermost level. Table 1460 of FIG. 14F describes the examination of data element F, in which the combination when data element C is the subordinate data is listed at the uppermost level.

The combinations of data elements are extracted as shown in table 1470 of FIG. 14G.

Then, in the extracted combinations, the data elements are ranked from the correlations of data elements. First, the main data and the subordinate data are specified as "data elements in circular relation", if there is a combination of data in which the main data and the subordinate are exchanged. That is, the combinations with a first data element as the main data and a second data element as the subordinate data, and the combinations with the first data element as the subordinate data and the second data element as the main data, are all specified (step S402).

For example, in table 1470 of FIG. 14G, because the combination in which data element A is the main data and data element B is the subordinate data, and the combination in which data element B is the main data and data element A is the subordinate data are present, data elements A and B are data elements in circular relation.

Herein, one of the two data elements in circular relation is presumed to be located at the uppermost level among the two or more data elements assigned to the same group. For example, when the data elements are inventors' names, inventors at lower levels depend upon inventors at upper levels in successive order, while the uppermost inventor necessarily depends on the lowest inventor.

Then, of the two data elements in circular relation that are specified, the data element having a greater number of occurrences of data is set to the uppermost level, "level 1", and the data element having a smaller number of occurrences is set to the lower level, "level 2" (steps S403 and S404). In the example of FIG. 14, since the number of occurrences of data element A is 14, and the number of occurrences of data element B is 9, data element A is set to "level 1", and data element B is set to "level 2."

Thereafter, a search is made for other data elements dependent upon the data elements at "level 1" or "level 2." If any such data element is found, it is correlated at the next lower level of the data element set at "level 1" or "level 2" (steps S405 to S407).

When one data element has a plurality of data elements correlated at the lower level, the data elements are sorted in descending order of priority according to dependence ratio, in descending order according to the number of occurrences, and alphabetically by data element name, and then associated. This process is repeated until there is no corresponding data element (steps S408 and S409).

In the example of FIG. 14, no data element dependency is found if any data element other than data element B dependent upon data element A at "level 1" is searched. Hence, the data element dependent upon data element B at the lower "level 2" is searched. Then, since data element C is dependent upon data element B as the subordinate data, data element C is set to "level 3," which is lower by one than the level of data element B.

Then, if the data element dependent upon data element C is searched, the data elements D, E and F are extracted, and set to "level 4," which is lower by one than the level of data element C. Each of the data elements D, E and F has a dependence ratio of 1.00 upon data element C. The number of occurrences of data element D is 3, whereas the numbers of occurrences of data elements E and F are 2. Therefore, data element D has the highest order of priority among D, E, and F. Also, since data elements E and F each occur twice, the priorities of data elements E and F are set according to alphabetical order of their data element names.

Figure 15:
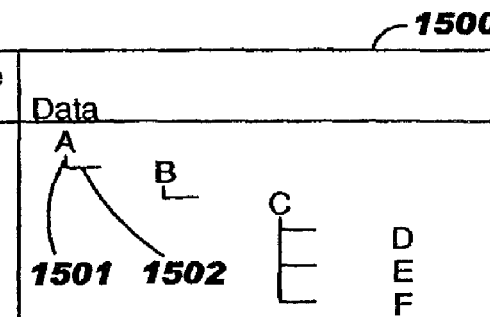
FIG. 15 is a table showing results in the form of tree.

After the data elements are sorted, an association diagram Zd 1500 is created in the form of a tree, as shown in FIG. 15. In the association diagram Zd, which is output by the output portion 40, data elements are represented at predetermined intervals in one direction at each of "level 1", "level 2", and so on. Furthermore, the data elements at two upper and lower levels, such as the data elements of "level 1" and "level 2" and the data elements of "level 2" and "level 3", are tied by the link line 1501, where the node 1502 represents correlation.

FIG. 15 shows an association diagram Zd 1500 of the data elements A, B, C, D, E and F assigned to the group "Gr1."

Herein, the assigned level, the number of occurrences of data, and the dependence ratio may be displayed with each of the data elements.

Similarly, tables 1610, 1620, and 1630 of FIGS. 16A to 16C show the combinations of the data elements G, H and I assigned to the group "Gr2." The combination with data element G as the main data and data element I as the subordinate data, the combination with data element H as the main data and data element G as the subordinate data, and the combination with data element I as the main data and data element G as the subordinate data are extracted as those having the highest dependence ratio, as shown in table 1640 of FIG. 16D.

Data elements G, H and I are classified into levels from the extracted combinations. An association diagram Zd 1700 representing the correlation of the data elements G, H and I is produced, as shown in FIG. 17.

Similarly, tables 1810 and 1820 of FIGS. 18A and 18B show the combinations of the data elements K and L assigned to the group "Gr3." The combination with data element K as the main data and data element L as the subordinate data, and the combination with data element L as the main data and data element K as the subordinate data, are extracted as those having the highest dependence ratio, as shown in table 1830 of FIG. 18C. Data elements K and L are classified into levels from the extracted combinations. An association diagram Zd 1900 representing the correlation of the data elements K and L is produced, as shown in FIG. 19.

The output portion 40 may output the analysis results to the user in another form, based on the grouping process performed by the analysis processing portion 30 in the manner described above. For example, the analysis processing portion 30 may employ the data sample as a key, rather than the data element as a key. For this purpose, the dependence ratio of data sample upon individual groups is calculated, based on the groups to which the data elements belonging to each data sample are assigned, whereby the group to which each data sample belongs is specified. Then, the dependence ratio ($\gamma$) of each data sample upon individual group may be calculated in accordance with the following expression:

Dependence ratio ($\gamma$)=(number of data elements dependent upon the group)/(total number of data elements constituting the data sample).

If the data sample is dependent upon more than one group, the groups are sorted in descending order of priority according to dependence ratios, in ascending order according to the number of occurrences of data elements belonging to the group, and alphabetically by group names. The group at the uppermost level is specified as the group to which the data sample belongs.

FIG. 20 shows a table 2000 listing the data elements A to L belonging to the data samples "10001" to "10031" of FIG. 3, and showing groups information from FIG. 10C. For example, in the data sample "10001", the data elements A and C belonging to the data sample "10001" are both assigned to the group "Gr1".

Accordingly, data sample "10001" depends on the group "Gr1" alone, and naturally, data sample "10001" is specified as belonging to the group "Gr1."

In this connection, the dependence ratio ($\gamma$) may be calculated as: Dependence ratio ($\gamma$)=2/2=1.00.

For example, the data sample "10024" has data element A assigned to group "Gr1" and data elements G and I assigned to group "Gr2". In this case, the data sample "10024" has a dependence ratio ($\gamma$) upon the group "Gr1" given by: Dependence ratio ($\gamma$)=1/3=0.33, and has a dependence ratio ($\gamma$) upon the group "Gr2", given by: Dependence ratio ($\gamma$)=2/3=0.67.

Accordingly, since the dependence ratio (γ) upon the group "Gr2" is highest, the data sample "10024" is specified as belonging to group "Gr2."

FIG. 21 shows a table 2100 listing the groups that the data sample belongs to as specified above Further, for each group that an individual data sample belongs to, the association diagram Zd of data elements 1500 as shown in FIG. 15, and the relation between individual data samples and data elements may be illustrated, as shown in FIG. 22. For example, in FIG. 22, the data sample to which the data elements A, B, C, D, E and F in the group "Gr1" belong is marked with sign "•".

Also, the output portion 40 may output the analysis results to the user in another form, based on the grouping process performed by the analysis processing portion 30 as described above. For example, the analysis processing portion 30 may employ the relation between groups as a key. For this, the number of occurrences of each group is calculated from the number of occurrences of each data element, and the group to which each data element is then assigned.

FIG. 23A shows a table 2310 listing the data elements A to L belonging to the data samples "10001" to "10031", respectively, of FIG. 4, and showing group information for groups "Gr1" to "Gr3" and "Gr9999" from FIG. 10C. For example, the table 2310 indicates that data element A occurs 14 times, and belongs to group "Gr1".

Based on this, the number of occurrences of each of the groups "Gr1", "Gr2", "Gr3" and "Gr9999" is calculated for the data samples "10001" to "10031", as shown in table 2320 of FIG. 23B. For example, the number of occurrences of the group "Gr1" is 42.

Subsequently, to obtain the correlation between groups, the combination of two data elements belonging to different groups is extracted from the combinations of data elements in the data sample, whereby the combination of relevant groups is specified.

FIG. 24 shows a table 2400 listing the number of simultaneous occurrences of the combinations of two data elements of FIG. 6, and shows group information for groups "Gr1" to "Gr3" and "Gr9999", assigned to the data elements A to L from FIG. 10C. For example, the table 2400 indicates that in the combination of data elements A and B, data element A belongs to group "Gr1" and data element B belongs to group "Gr1," and that the number of simultaneous occurrences is 7.

FIG. 25A shows a table 2510 listing the number of simultaneous occurrences for the combinations of two groups, based on FIG. 24, in which the number of simultaneous occurrences for the combination of the group "Gr1" to which the data elements A, B, C, D, E and F belong, and the group "Gr2" to which the data elements G, H and I belong, is equal to 2. However, the table has redundant information regarding membership in the same group twice rather than in two different groups; consequently, the combinations of identical groups is excluded.

FIG. 25B shows a table 2520 listing the number of simultaneous occurrences for the combinations of two different groups. For example, the number of simultaneous occurrences of the combination of groups "Gr1" and "Gr2" is 2, and other combinations are 0. That is, only the groups "Gr1" and "Gr2" are correlated.

For the correlated groups, the dependence ratio between groups is calculated in the same manner as for the data elements, thereby creating data for outputting the association diagram in the form of a tree.

In the exemplary table 2600 of FIG. 26, for the correlated groups "Gr1" and "Gr2", when group "Gr1" is the main data and group "Gr2" is the subordinate data, the number of occurrences of group "Gr1" as the main data is 42, and the number of simultaneous occurrences of groups "Gr1" and "Gr2" is 2. Consequently, the dependence ratio (δ) of the main data upon the subordinate data may is: Dependence ratio (δ)=2/42=0.05. Similarly, when group "Gr2" is the main data, the dependence ratio (δ) upon the group "Gr1" is 0.11.

Based on this, data is created for the association diagram Zg 2700 of groups as shown in FIG. 27, in the same manner as the process for creating the association diagram Zd 1500 of data elements shown in FIG. 15. The output portion 40 outputs the association diagram Zg 2700 of groups to the user.

Figure 28:
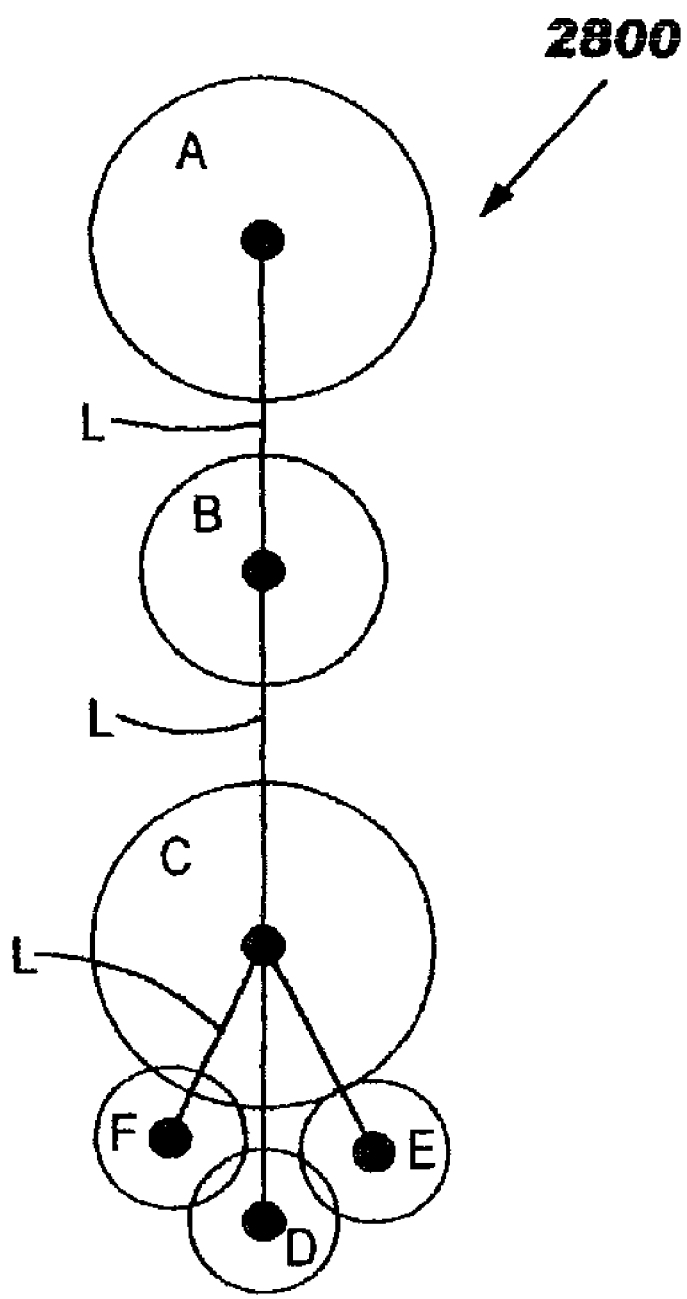
FIG. 28 shows analysis results in the form of a balloon figure.

The association of data elements may also be indicated by using balloon figures as shown in association diagram 2800 of FIG. 28. For each group, the number of occurrences of each data element is proportional to the area of an associated balloon (circle). Other relevant data elements are connected by the links L. The dependence ratio of a data element upon another data element is represented by the distance between connected balloons.

The square root of the number of occurrences of each data element is calculated, and multiplied by a scaling factor P to obtain a diameter (d) of balloon, as follows: d=(square root of the number of occurrences of data element)×(P). The distance between the centers of the balloons representing the correlated data elements, namely the length S of link L, may be defined as: S=(square root (1/(dependence ratio+M))×(summation of radius of balloon of correlated data elements)×Q. Herein, a small number M is added so that the denominator of the fraction may not be zero when the dependence ratio is zero. Also, the dependence ratio of a lower-level data element upon an upper-level data element is employed.

FIG. 29A shows a table 2910 listing the diameters of the balloons representing the data elements A, B, C, D, E and F making up the group "Gr1." For example, for data element A, the number of occurrences is 14, the dependence ratio upon data element B is 0.50, and the diameter d may be calculated as: d=7SQRT(14)=26.2 (mm), where P is equal to 7.0.

FIG. 29B shows a table 2920 listing the summations of the radii of balloons of correlated data elements, $(1/(\text{dependence ratio}+M))^{0.5}$, and the lengths S of the links L between data elements, in which the summation ds of radii of associated data elements A and B is calculated as: ds=26.2/2+21.0/2=23.60.

Since the dependence ratio of lower-level data element B upon upper-level data element A is 0.78, $(1/(\text{dependence ratio}+M))^{0.5}=(1/0.78)^{0.5}=1.13$.

Accordingly, the length S of link L between the data elements A and B may be calculated as S=1.13×23.6×1.0=26.72, where the constant Q is equal to 1.0.

The balloon FIG. 28 shows the association of the data elements A, B, C, D, E and F making up the group "Gr1," based on the information of FIGS. 29A and 29B as calculated in the above manner. Herein, the data elements are arranged from highest to lowest level successively. Each of the data elements is represented by a balloon having the diameter d as indicated in table 2910 of FIG. 29A. The length of link L between the center of the balloon representing data element A at "level 1" and the center of the balloon representing data element B at "level 2" is 26.72 mm.

Herein, the balloon of data element C is linked with the balloon of data element B at upper "level 2," and the balloons of data elements D, E and F at lower "level 4."

When the center of one balloon is intersected by a plurality of links L, the angle made by one link to an adjacent link L is proportional to the number of occurrences of the data element to be linked. For example, the numbers of occurrences of data elements B, D, E and F linked to data element C are 23, 2, 3 and 2, respectively, and the total is 30, as shown in table 2930 of FIG. 29C. Accordingly, an occupancy angle θ of each data element over a total circumference of 360 degrees may be defined as: θ=(number of occurrences/total number of occurrences)×360. For example, the occupancy angle θ of data element B may be calculated as: θ=(23/30)×360=276 degrees.

If the link L corresponding to each data element is arranged in the center of the occupancy angle θ, a link-to-link angle θm with the adjacent other data element may be defined as: θm= (occupancy angle (θ) of data element+occupancy angle (θ) of adjacent other data element)/2. For example, the link-to-link angle θm with data element E adjacent to the link L of data element B is calculated as: θm=(276+24)/2=150 degrees.

Table 2930 of FIG. 29C shows the angles of the links L connecting the data elements B, D, E and F to data element C, calculated in the above manner.

For the data element having two links L at upper and lower levels, such as data element B, the length S of the link L located between the upper and lower level data elements may be determined, based on the dependence ratio upon the upper level data element and the dependence ratio upon the lower level data element. For example, as shown in table 3000 of FIG. 30, for data element B, the length S of the link L located between the upper level data element A and the lower level data element C is:

Length $(S)=(1/(\text{dependence ratio}+M))^{0.5}\times(\text{summation of radius of balloon of correlated data elements})\times Q.$ Herein, since the dependence ratio of the lower level data element C upon the upper level data element A is 0.42: S=39.07 mm.

Figure 31:
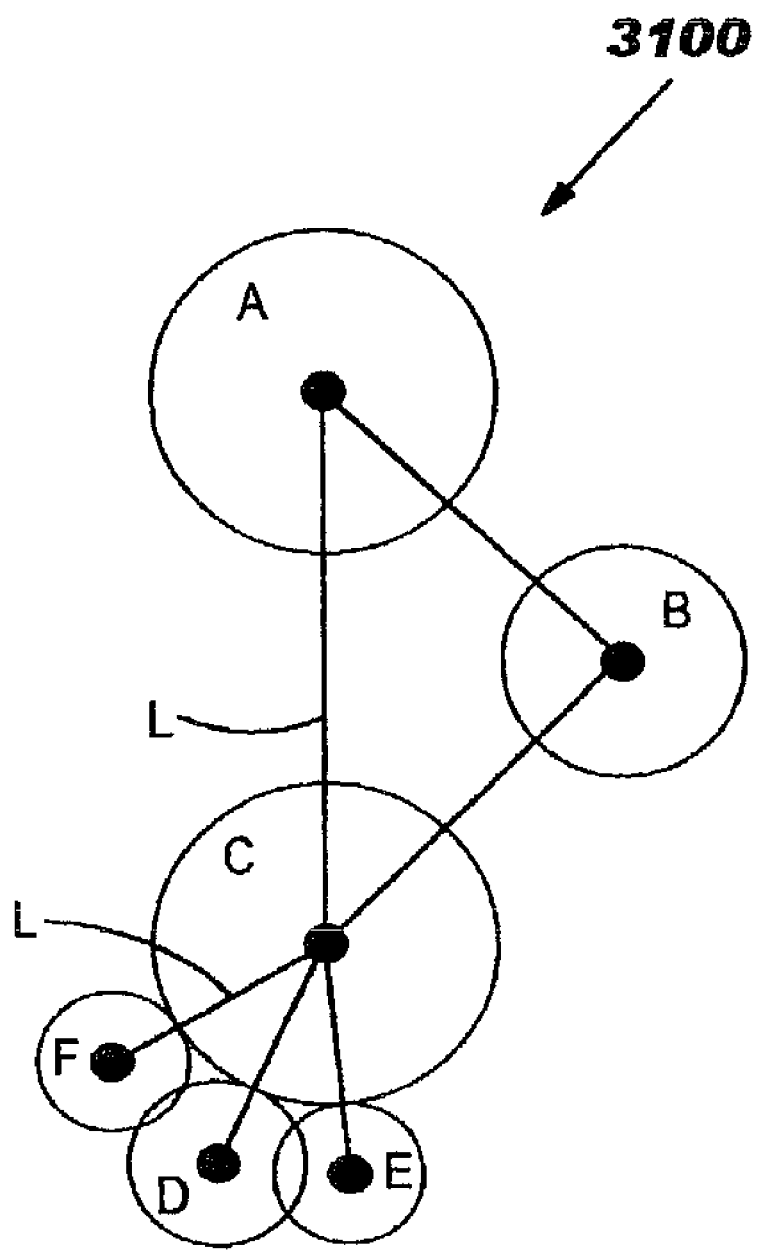
FIG. 31 shows the examined results of FIG. 30 in the form of a balloon figure.

FIG. 31 shows the relation between the data elements A and C in the form of a balloon FIG. 3100. In the above configuration, wherein the data has a one-to-many relation, the data elements can be grouped according to the numbers of occurrences of each data element and the dependence ratios with the predetermined thresholds. At this time, since the data elements with small numbers of occurrences and the data elements with lower dependence ratios can be excluded, it is possible to make the grouping efficiently by limiting the number of data elements being classified into the specific group.

Further, data elements not belonging to any group can be grouped, based on the group that a simultaneously occurring data element belongs to. Additionally, the subordinate relation of data element within the same group may be specified, based on the numbers of occurrences of the data elements and the dependence ratios, and displayed to the user as a tree or balloon figure. This allows the user to spatially envision the results of the data analysis.

Additionally, the data analysis results may be displayed visually in the above manner. By selecting an area of the display that shows the data element or group, the selected data element or group may be specified as a data retrieval condition.

When no data field is explicitly defined, for example in the case of patents, the data may be sentences, phrases, or chapters in the text of the specification, and the words contained therein may be the data elements. Thus a grouping of words or a display of figures representing the relation between words can be made.

Further, the similarity of data may be measured by comparing the similarity of tree figures or balloon figures.

In the above exemplary embodiment, the system includes the database 10, the interface 20, the analysis processing portion 30 and the output portion 40; other embodiments may be configured as integrated systems. For example, the database 10 or the analysis processing portion 30 may communicate with the interface 20 or the output portion 40 via a network such as the Internet or LAN, or the analysis processing portion 30 may be provided on the user's side, along with the interface 20 or the output portion 40, to enable access to the database 10 via the network.

Figure 32:
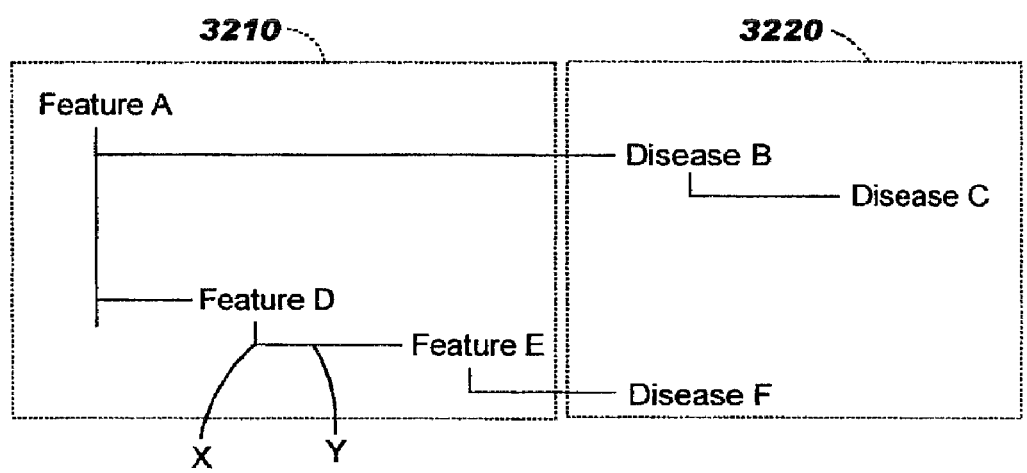
FIG. 32 is a diagram showing an example having several kinds of data elements.

Data elements are not limited to one kind, for example inventors' names, but may comprise of a plurality of kinds of data, for example genetic features and diseases. In this case, when representing data elements in the form of tree figures, the display areas 3210 and 3220 may be divided as shown in FIG. 32.

A program for enabling a computer to execute the data analysis process as shown in the above embodiment may be provided in the form of the storage medium or the program transmission unit as cited below. That is, the storage medium may be a computer readable storage medium such as CD-ROM, DVD, memory or hard disk to store the program for enabling the computer to execute the data analysis process.

Also, the program transmission unit may comprise storage means such as CD-ROM, DVD, memory or hard disk to store the above program, and transmission means for transmitting the program via the network such as the Internet or LAN on the side of the apparatus for reading the program from the storage means and executing the program. This program transmission unit is suitable particularly for installing the program for performing the above process in a computing analysis apparatus or the like.

While the invention has been described in terms of preferred embodiments, it should be understood that numerous modifications may be made thereto without departing from the spirit and scope of the invention as defined by the appended Claims.

I claim:

1. A data analysis system for determining a correlation among data elements based on a comparison of (i) a number of occurrences, in stored data, of a first data element, and (ii) a number of simultaneous occurrences, in the stored data, of the first data element and a second data element, and for forming data elements into groups based on a multitude of predetermined conditions; the data analysis system comprising:

a computing system, executing a data analysis program, for calculating dependence ratios for each pair of the data elements based on the number of simultaneous occurrences in the stored data of said pair of the data elements, the dependence ratio for each pair of first and second of the data elements being equal to a ratio of the number of simultaneous occurrences of the first and second data elements in the stored data to the number of occurrences of the first data element in the stored data, wherein in each of said simultaneous occurrences, the first data element and the second data element coexist in a defined sample or subset of the stored data, and for forming into groups all of the data elements that have a dependence ratio with at least one of the other data elements greater than a first threshold by:

i) forming a first group; and ii) putting selected ones of the data elements into the first group based on the dependence ratios of the data elements;

for the remaining data elements that are not put in the first group, continuing to form one or more additional groups of the data elements, based on the dependence ratios of the data elements, until all of the data elements that have a dependence ratio with at least one of the other data elements, greater than the first threshold are placed into one of the formed groups; and output means for outputting results provided by the analysis processing means.

2. A data analysis system according to claim 1, wherein:

the first group is formed by selecting a first of the data elements, and putting said first of the data elements into the first group; and the selected ones of the data elements are put into the first group by selecting a second of the data elements, and putting the second of the data elements into the first group when the dependence ratio of the first and second data elements exceeds a defined threshold.

3. A data analysis system according to claim 2, wherein the selected ones of the data elements are put into the first group further by selecting a third of the data elements, and putting the third of the data elements into the first group when the dependence ratio of the second and third data elements exceeds said defined threshold.

4. Apparatus for data analysis, comprising:

analysis processing means for specifying pairs of keywords based on frequencies that keywords occur in a set of keywords of data stored in a database, and grouping the set of keywords into groups of keywords based on the specified pairs of keywords, said analysis processing means including a computing system, executing a data analysis program, for determining a dependence ratio for each of said pair of keywords based on a comparison of (i) a number of occurrences, in said set of keywords, of a first of the pair of keywords, and (ii) a number of simultaneous occurrences, in said set of keywords, of both of said pair or keywords, the dependence ratio for each pair of first and second of the keywords being equal to a ratio of the number of simultaneous occurrences of the first and second keywords in the set of keywords to the number of occurrences of the first keyword in the set of keywords, wherein in each of said simultaneous occurrences, the first keyword and the second keyword coexist in a defined sample or subset of the set of keywords, and for forming all of the keywords that have a dependence ratio with at least one of the other keywords greater than a first threshold into groups by:

i) forming a first group; and ii) putting selected ones of the keywords into the first group based on the dependence ratios of the keywords;

for the remaining keywords that are not put in the first group, continuing to form one or more additional groups of the keywords, based on the dependence ratios of the keywords, until all of the keywords that have a dependence ratio with at least one of the other keywords, greater than the first threshold are placed into one of the formed groups; and output means for outputting results provided by the analysis processing means.

5. Apparatus for data analysis system according to claim 4, wherein:

the first group is formed by selecting a first of the keywords, and putting said first of the keywords into the first group; and the selected ones of the keywords are put into the first group by selecting a second of the keywords, and putting the second of the keywords into the first group when the dependence ratio of the first and second keywords exceeds a defined threshold.

6. Apparatus for a data analysis system according to claim 5, wherein the selected ones of the keywords are put into the first group further by selecting a third of the keywords, and putting the third of the keywords into the first group when the dependence ratio of the second and third keywords exceeds said defined threshold.

7. A data analysis method, comprising the steps of:

calculating dependence ratios of a plurality of data elements in a data set to be analyzed, including the step of calculating one of the dependence ratios for each pair of data elements of a set of pairs of said data elements based on a comparison of (i) a number of occurrences, in said data set, of a first of said each pair of data elements, and (ii) a number of simultaneous occurrences, in said data set, of both of said each pair of data elements; the dependence ratio for each pair of first and second of the data elements being equal to a ratio of the number of simultaneous occurrences of the first and second data elements in the stored data to the number of occurrences of the first data element in the stored data, wherein in each of said simultaneous occurrences, the first data element and the second data element coexist in a defined sample or subset of the stored data, grouping the data elements according to the dependence ratios including the step of forming data elements into groups based on a multitude of conditions;

wherein all of the data elements that have a dependence ratio with at least one of the other data elements greater than a first threshold are formed into groups by:

i) forming a first group; and ii) putting selected ones of the data elements into the first group based on the dependence ratios of the data elements;

for the remaining data elements that are not put in the first group, continuing to form one or more additional groups of the data elements, based on the dependence ratios of the data elements, until all of the data elements that have a dependence ratio with at least one of the other data elements, greater than the first threshold are placed into one of the formed groups; and outputting the grouped data elements, including the step of displaying the grouped data elements on a display device.

8. A data analysis method according to claim 7, wherein:

the first group is formed by selecting a first of the data elements, and putting said first of the data elements into the first group; and the selected ones of the data elements are put into the first group by selecting a second of the data elements, and putting the second of the data elements into the first group when the dependence ratio of the first and second data elements exceeds a defined threshold.

9. A data analysis method according to claim 8, wherein the selected ones of the data elements are put into the first group further by selecting a third of the data elements, and putting the third of the data elements into the first group when the dependence ratio of the second and third data elements exceeds said defined threshold.

* * * * *